United States Patent
Lee et al.

(10) Patent No.: US 8,411,164 B2
(45) Date of Patent: Apr. 2, 2013

(54) MOBILE TERMINAL AND METHOD FOR AUTOMATIC GEOTAGGING

(75) Inventors: Jung-Sub Lee, Seoul (KR); Tae-Sook Yoon, Incheon (KR); Sung-Ho Woo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 383 days.

(21) Appl. No.: 12/360,015

(22) Filed: Jan. 26, 2009

(65) Prior Publication Data

US 2010/0045518 A1 Feb. 25, 2010

(30) Foreign Application Priority Data

Aug. 20, 2008 (KR) ........................ 10-2008-0081342

(51) Int. Cl.
*H04N 5/76* (2006.01)
*H04N 7/00* (2006.01)
*H04N 7/18* (2006.01)
*H04N 9/47* (2006.01)

(52) U.S. Cl. ..................................... 348/231.2; 348/116

(58) Field of Classification Search .................. 348/116, 348/113, 222.1, 231.3; 384/231.2
See application file for complete search history.

(56) References Cited

U.S. PATENT DOCUMENTS

| | | | |
|---|---|---|---|
| 6,222,985 B1 * | 4/2001 | Miyake | 386/224 |
| 6,995,792 B1 * | 2/2006 | Ogura | 348/231.99 |
| 7,103,267 B2 * | 9/2006 | Miyake | 386/227 |
| 7,539,411 B2 * | 5/2009 | Uchiyama et al. | 396/310 |
| 2001/0010549 A1 * | 8/2001 | Miyake | 348/232 |
| 2003/0058344 A1 | 3/2003 | Mino | |
| 2004/0201676 A1 | 10/2004 | Needham | |
| 2004/0201702 A1 * | 10/2004 | White | 348/207.99 |
| 2005/0162699 A1 | 7/2005 | Fukunaga et al. | |
| 2007/0179705 A1 | 8/2007 | Asai | |
| 2007/0200862 A1 * | 8/2007 | Uchiyama et al. | 345/564 |

FOREIGN PATENT DOCUMENTS

EP 1566743 8/2005

\* cited by examiner

*Primary Examiner* — Nicholas Giles
(74) *Attorney, Agent, or Firm* — Lee, Hong, Degerman, Kang & Waimey

(57) ABSTRACT

A mobile terminal and method for automatic geotagging are disclosed. The mobile terminal includes a camera for capturing an image and for generating image data, a location information module for determining location information of the mobile terminal, and a controller configured to concurrently operate the camera and the location information module in response to a user input and to store the location information with the image data.

11 Claims, 25 Drawing Sheets

MOBILE TERMINAL AND METHOD FOR AUTOMATIC GEOTAGGING

CROSS-REFERENCE TO RELATED APPLICATIONS

Pursuant to 35 U.S.C. §119(a), this application claims the benefit of earlier filing date and right of priority to Korean Application No. 10-2008-0081342, filed on Aug. 20, 2008, the contents of which is incorporated by reference herein in its entirety.

FIELD OF THE INVENTION

The present invention relates to a mobile terminal, and more particularly, to a method for automatic geotagging in a mobile terminal.

DESCRIPTION OF THE RELATED ART

A mobile terminal is a device that may be configured to perform various functions. Examples of such functions include data and voice communications, capturing images and video via a image capture device, recording audio, playing music files via a speaker system, and displaying images and video on a display. Mobile terminals may include additional functionality which supports game playing, while other mobile terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components forming the mobile terminal.

Recently, as more mobile terminals employ Global Positioning System (GPS) technology, there is a need to increase the range of services provided by the mobile terminals using GPS techniques.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to one embodiment of the present invention, a mobile terminal for automatically geotagging image data is provided. The mobile terminal includes a camera for capturing an image and for generating image data, a location information module for determining location information of the mobile terminal, and a controller configured to concurrently operate the camera and the location information module in response to a user input, and where the controller is further configured to store the location information with the image data.

In one aspect of the invention, the controller displays an indicator that indicates a status of the location information. In another aspect of the invention, the controller displays an icon on a display of the mobile terminal to indicate a status of the location information and periodically changes the icon or a color of the icon. In yet another aspect of the invention, the controller stores geographical information corresponding to the location information with the image data.

In one aspect of the invention, if an image capture command is input by the user after the location information has been determined, the controller stores the location information with the image data. Preferably, the location information is stored with the image data in an exchangeable image file (EXIF) format. In another aspect of the invention, if an image capture command is input by the user before the location information has been determined, the controller waits for the location information to be determined and stores the location information with the image data. In yet another aspect of the invention, if an image capture command is input by the user before the location information has been determined, the controller stores the image data without the location information.

According to one embodiment of the present invention, a method for automatically geotagging image data in a mobile terminal is provided. The method includes operating a camera of the mobile terminal in response to a user input, operating a location information module concurrently with the camera in response to the user input, and storing location information with the image data. According to this embodiment, the camera is configured to generate the image data and the location information module is configured to determine the location information.

In one aspect of the invention, the method includes displaying an indicator on a display of the mobile terminal, where the indicator indicates a status of the location information. In another aspect of the invention, storing the location information with the image data is performed if the location information has been determined. In yet another aspect of the invention, storing the location information with the image data further includes storing the location information with the image data in an exchangeable image file (EXIF) format.

In another embodiment of the invention, the method further includes determining whether the location information has been determined, waiting for the location information module to determine the location information if the location information has not been determined, and storing the location information with the image data if the location information has been determined.

In yet another embodiment of the invention, the method further includes determining whether the location information has been determined and storing the image data without the location information if the location information has not been determined.

In one embodiment of the invention, storing the image data with the location information further includes storing geographical information corresponding to the location information with the image data.

In another embodiment of the invention, the method further includes determining a latest determined location information if the location information cannot be determined and storing the latest determined location information with the image data.

In yet another embodiment, the method further includes grouping one or more of the image data according to the location information and geographical information corresponding to the location information and storing the one or more of the image data based on the grouping. In one aspect of the invention, the geographical information is retrieved from a database.

Further scope of applicability of the present invention will become apparent from the detailed description given hereinafter. However, it should be understood that the detailed description and specific examples, while indicating preferred embodiments of the invention, are only provided as illustrations, since various changes and modifications within the spirit and scope of the invention will become apparent to those skilled in the art from this detailed description.

BRIEF DESCRIPTION OF THE DRAWINGS

The present invention will be more fully understood from the detailed description and the accompanying drawings, which serve to illustrate the embodiments of the invention.

DETAILED DESCRIPTION OF THE PREFERRED EMBODIMENTS

The mobile terminal according to exemplary embodiments of the present invention will now be described with reference to the accompanying drawings. In the following description, usage of terms such as "module," "part," or "unit" in referring to elements merely facilitate the explanation of the present invention, without having any significant meaning per se. It should be noted that the terms "module," "part," and "unit" may be used interchangeably.

Figure 1:
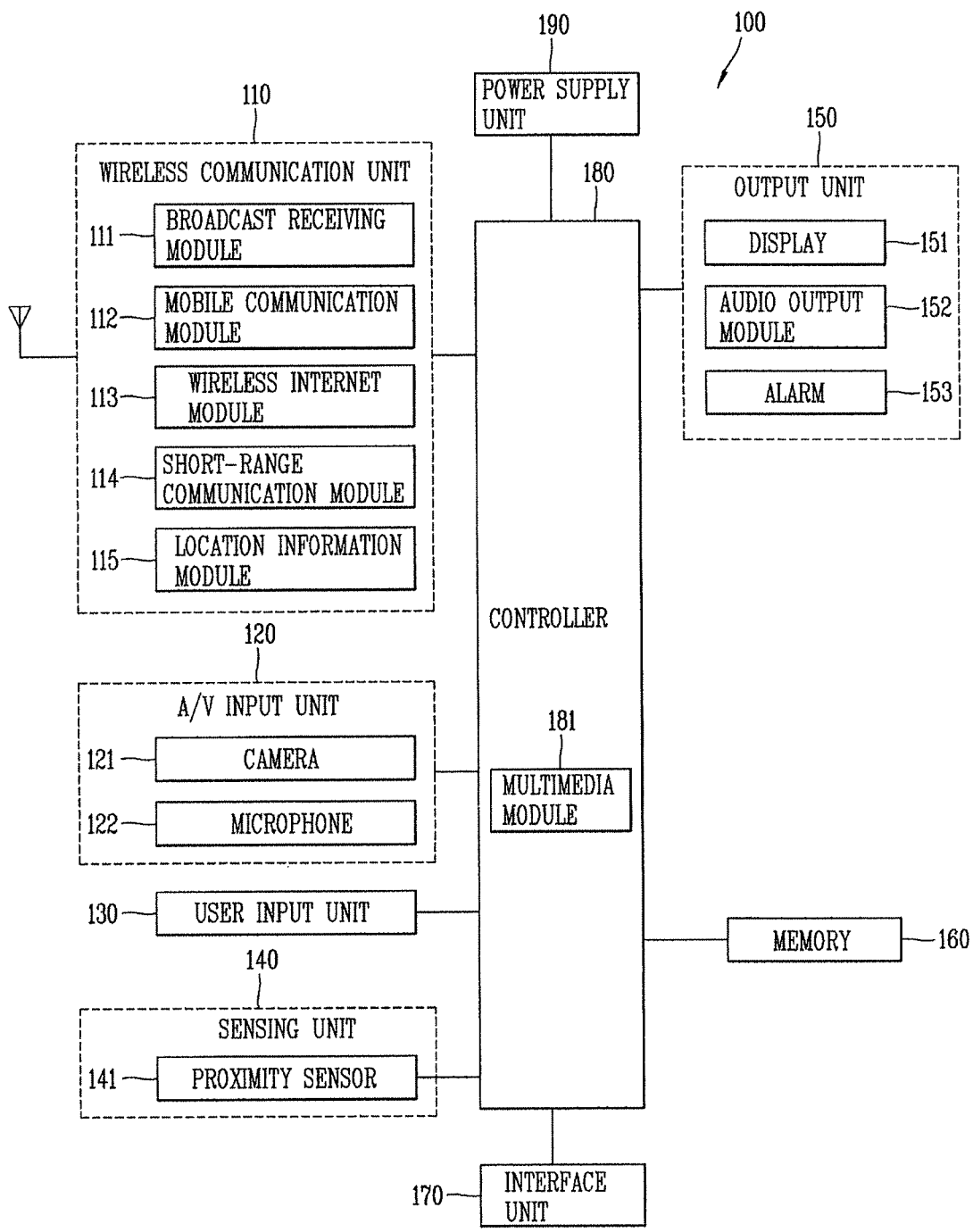
FIG. 1 is a block diagram of a mobile terminal according to one embodiment of the present invention.

FIG. 1 is a block diagram of a mobile terminal 100 according to one embodiment of the present invention.

The mobile terminal 100 may be implemented in various forms. For example, the mobile terminal 100 may be implemented as a portable device, such as a mobile phone, a smart phone, a notebook computer, a digital broadcast receiver, a personal digital assistant (PDA), a portable multimedia player (PMP), or a navigation device.

The mobile terminal 100 may include a wireless communication unit 110, an Audio/Video (A/V) input unit 120, a user input unit 130, a sensing unit 140, an output unit 150, a memory 160, an interface unit 170, a controller 180, and a power supply unit 190.

FIG. 1 shows the mobile terminal 100 as having various components, but it should be understood that implementation of all the illustrated components is not a requirement. The mobile terminal 100 may include greater or fewer components.

The wireless communication unit 110 includes one or more components for allowing radio communication between the mobile terminal 100 and a wireless communication system or a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server, or other network entity, via a broadcast channel. The broadcast channel may include a satellite channel and/or a terrestrial channel. The broadcast management server may be a server that generates and transmits a broadcast signal and/or broadcast associated information, or a server that receives a previously generated broadcast signal and/or broadcast associated information and transmits the broadcast signal and/or broadcast associated information to a terminal.

For example, the broadcast associated information may be information regarding a broadcast channel, a broadcast program, or a broadcast service provider. The broadcast signal may include a television broadcast signal, a radio broadcast signal, and a data broadcast signal. The broadcast signal may further include a broadcast signal combined with a television or radio broadcast signal.

The broadcast associated information may also be provided via a mobile communication network using a communication standard, such as the 3rd Generation Partnership Project (3GPP), 3rd Generation Partnership Project 2 (3GPP2), Institute of Electrical and Electronics Engineers (IEEE), code division multiple access (CDMA), Global System for Mobile communications (GSM), Open Mobile Alliance (OMA), and 4G techniques. Therefore, the broadcast associated information can be received via the mobile communication module 112.

The broadcast signal may take various forms. For example, the broadcast signal may have the form of an electronic program guide (EPG) of the digital multimedia broadcasting (DMB), or an electronic service guide (ESG) of the digital video broadcast-handheld (DVB-H).

The broadcast receiving module 111 may be configured to receive signals broadcast by various types of broadcast systems. In particular, the broadcast receiving module 111 may receive a digital broadcast by using a digital broadcast system, such as digital multimedia broadcasting-terrestrial (DMB-T), digital multimedia broadcasting-satellite (DMB-S), digital video broadcast-handheld (DVB-H), the data broadcasting system known as media forward link only (MediaFLO®), or integrated services digital broadcast-terrestrial (ISDB-T). The broadcast receiving module 111 is configured to be suitable for every broadcast system that provides a broadcast signal as well as the above-mentioned digital broadcast systems.

Broadcast signals and/or broadcast-associated information received via the broadcast receiving module 111 may be stored in a storage medium, such as the memory 160.

The mobile communication module 112 transmits and/or receives radio signals to and/or from at least one of a base station, such as an access point or Node B, an external terminal (e.g., other user devices), and a server (or other network entities). Such radio signals may include a voice call signal, a video call signal, or various types of data according to text and/or multimedia message transmission and/or reception.

The wireless Internet module 113 supports wireless Internet access for the mobile terminal 100. For example, the wireless Internet module 113 can be internally or externally coupled to the mobile terminal 100. The wireless Internet technology implemented by wireless Internet module 113 can be a wireless local area network (WLAN), Wi-Fi, Wireless Broadband (WiBro), World Interoperability for Microwave Access (WiMAX), or High-Speed Downlink Packet Access (HSDPA).

The short-range communication module 114 is a module for supporting short range communications. For example, short-range communication module 114 can be configured to communicate using a short-range communication technology, such as Bluetooth™, radio-frequency identification (RFID), Infrared Data Association (IrDA), Ultra-wideband (UWB), or ZigBee™.

The location information module 115 is a module for determining a location or a position of the mobile terminal 100. For example, the location information module 115 can include a Global Positioning System (GPS) module. The GPS module can measure, for example, an accurate time and distance from three or more satellites and can accurately determine the location of the mobile terminal 100. Currently, a method of acquiring location and time information by using three satellites and performing error correction on the calculated location and time information with a single satellite is widely used. In addition, the GPS module can calculate speed information by continuously calculating a current location in real time.

The A/V input unit 120 is configured to receive an audio or video signal. The A/V input unit 120 may include an image capture device, such as camera 121, and a device for detecting sounds, such as microphone 122. The camera 121 processes image data of still pictures or video obtained in a video capturing mode or an image capturing mode of the mobile terminal 100. The processed image frames may be displayed on a visual output device, such as the display 151.

The image frames processed by the camera 121 may be stored in the memory 160 or other storage medium, or transmitted via the wireless communication unit 110. Other embodiments of the mobile terminal 100 may include more than one camera 121.

The microphone 122 may receive sounds or audible data via a microphone in a phone call mode, a recording mode, or a voice recognition mode, and can process such sounds into audio data. For example, when the mobile terminal 100 is in a phone call mode, the processed audio (voice) data may be converted for output into a format that may be transmitted to a mobile communication base station, or other network entity, via the mobile communication module 112. The microphone 122 may include various types of noise canceling or suppression algorithms to cancel noise or interference generated in the course of receiving and transmitting audio signals.

The user input unit 130 can be a user input device configured to generate key input data from commands entered by a user to control various operations of the mobile terminal 100. The user input unit 130 allows the user to enter various types of information, and may include a keypad, a dome switch, a jog wheel, a jog switch, and/or a touch pad, such as a touch sensitive member that detects changes in resistance, pressure, or capacitance as a result of contact. In one embodiment, the touch pad is overlaid on the display 151 in a layered manner to form a touch screen.

The sensing unit 140 detects a current status or state of the mobile terminal 100, such as an opened or closed state, a location of the mobile terminal, the presence or absence of user contact with the mobile terminal, the orientation of the mobile terminal, or an acceleration or deceleration movement and direction of the mobile terminal. The sensing unit 140 may include a proximity sensor 141, which will be described in association with the touch screen. The sensing unit 140 can also generate commands or signals for controlling the operation of the mobile terminal 100.

For example, when the mobile terminal 100 is implemented as a slide type mobile phone, the sensing unit 140 may sense whether the phone is opened or closed. In addition, the sensing unit 140 can detect whether the power supply unit 190 supplies power or whether the interface unit 170 is coupled with an external device.

The interface unit 170 serves as an interface via which at least one external device may be connected with the mobile terminal 100. For example, an external device may be a wired or wireless headset port, an external power supply or battery charger port, a wired or wireless data port, a memory card port, a port for connecting a device having an identification module, an audio input/output (I/O) port, a video I/O port, or an earphone port.

The identification module may be an element with memory or storage capabilities, such as a memory chip, configured to store various information for authenticating a user's authority to use the mobile terminal 100. The identification module may include a user identity module (UIM), a subscriber identity module (SIM), or a universal subscriber identity module (USIM).

The interface unit 170 may be used to receive inputs, such as data, information, and/or power, from an external device and to transfer the received inputs to one or more elements within the mobile terminal 100. The interface unit 170 may also be used to transfer data between the mobile terminal 100 and an external device.

In addition, when the mobile terminal 100 is connected with an external cradle, the interface unit 170 may serve as a conduit to allow power from the cradle to be supplied to the mobile terminal 100, or may serve as a conduit to allow various command signals to be transferred to the mobile terminal via the cradle. Various command signals or power provided by the cradle may operate as signals for recognizing when the mobile terminal 100 is properly mounted on the cradle.

The output unit 150 is configured to provide outputs in a visual, audible, and/or tactile manner. For example, the output unit 150 can provide an audio signal, a video signal, an alarm signal, and/or a vibration signal. The output unit 150 may include the display 151, an audio output module 152, and an alarm 153.

The display 151 may display information processed in the mobile terminal 100. For example, when the mobile terminal 100 is in a phone call mode, the display 151 may display a user interface (UI) or a graphical user interface (GUI) associated with a call or other communication, such as text messaging or multimedia file downloading. When the mobile terminal 100 is in a video call mode or image capturing mode, the display 151 may display a captured image and/or received image, or a UI or a GUI that shows videos or images and related functions.

When the display 151 and the touch pad are overlaid in a layered manner to form a touch screen, the display 151 may function as both an input device and an output device. The touch screen may be configured to detect a touch input pressure, a touch input position, or a touch input area. The display 151 may include a liquid crystal display (LCD), a thin film transistor liquid crystal display (TFT-LCD), an Organic Light Emitting Diode (OLED) display, a flexible display, or a three-dimensional (3D) display.

In one embodiment, the display 151 may be configured as a transparent display, such as a Transparent Organic Light Emitting Diode (TOLED) display. The mobile terminal 100 may include two or more displays 151. For example, the mobile terminal 100 may include both an external display module (not shown) and an internal display module (not shown).

The proximity sensor 141 may be located within or near the touch screen. The proximity sensor 141 is a sensor for detecting the presence or absence of an object relative to a detection surface or an object that is located nearby. The proximity sensor 141 performs detection without any physical contact by using the force of electromagnetism or infrared rays. Therefore, the proximity sensor 141 has a considerably longer life span than a contact type sensor, and can be used for various purposes.

The proximity sensor 141 may be a transmission type photo sensor, a direct reflection type photo sensor, a mirror-reflection type photo sensor, a radio frequency (RF) oscillation type proximity sensor, a capacitance type proximity sensor, a magnetic proximity sensor, or an infrared proximity sensor.

The operation of an RF oscillation type proximity sensor will now be described. When an object approaches the sensor detection surface in a state when an RF static wave is oscillated by an oscillation circuit, the oscillation amplitude of the oscillation circuit is attenuated or substantially reduced. The change in oscillation amplitude is converted into an electrical signal to detect the presence or absence of an object. Therefore, even if a non-metallic material is positioned between the RF oscillation proximity sensor and an object, a proximity switch can still detect the object despite the presence of the non-metallic material.

If the touch screen is an electrostatic type, the approach of a pointer, such as a stylus, can be detected even without the proximity sensor 141 based on a change in a field according to the approach of the pointer. Therefore, although the pointer is not actually brought into contact with the touch screen, but merely positioned close to the touch screen, the position of the pointer and the distance between the pointer and the touch screen can be detected.

To maintain brevity, recognition of the pointer when the pointer is positioned close to the touch screen will be referred to as a "proximity touch," while recognition of the pointer when the pointer is actually in contact with the touch screen will be referred to as a "contact touch." Therefore, when the pointer has made a proximity touch, it should be understood that the pointer is positioned substantially perpendicular to the surface of the touch screen.

Via the proximity sensor 141, a proximity touch and a proximity touch pattern, such as proximity touch distance, a proximity touch speed, a proximity touch time, a proximity touch position, or a proximity touch movement state can be detected. For example, information corresponding to the detected proximity touch operation and the proximity touch pattern can be output to a touch screen.

The audio output module 152 may convert and output data received from the wireless communication unit 110, or stored in the memory 160, to sound audio data in a call signal reception mode, a call mode, a record mode, a voice recognition mode, or a broadcast reception mode. The audio output module 152 may also provide audible outputs related to a particular function performed by the mobile terminal 100, such as a call signal reception sound or a message reception sound. The audio output module 152 may include a speaker, a buzzer, or other sound generating device.

The alarm 153 may provide outputs to indicate the occurrence of an event in the mobile terminal 100. For example, events may include call reception, message reception, key signal inputs, or a touch input.

In addition to audio or video outputs, the alarm 153 may provide outputs in a different manner to indicate the occurrence of an event. For example, the alarm 153 may provide an output in the form of vibrations, or other tactile or sensible outputs. When a call, a message, or other incoming communication is received, the alarm 153 may provide tactile outputs, such as vibrations, to inform the user of the communication.

By providing such tactile outputs, the user can recognize the occurrence of various events even if the mobile terminal 100 is in the user's pocket. Outputs indicating the occurrence of an event may also be provided via the display 151 or the audio output module 152.

The memory 160 can be used to store software programs used for the processing and controlling operations performed by the controller 180, or data, such as a phonebook, a message, a still image, or a video. In addition, the memory 160 may store data related to various patterns of vibrations and audio signals for output when a touch is applied to the touch screen.

The memory 160 can include at least one type of storage medium, such as a flash memory, a hard disk, a multimedia card, a random access memory (RAM), a static random access memory (SRAM), a read-only memory (ROM), a programmable read-only memory (PROM), an electrically erasable programmable read-only memory (EEPROM), a magnetic memory, a magnetic disk, an optical disk, or a card-type memory, such as a Secure Digital card. In other embodiments, the memory 160 can be a network storage device that can be accessed by mobile terminal 100 via a network connection.

The controller 180 controls the general operations of the mobile terminal 100. The controller 180 can be a microprocessor. For example, the controller 180 can perform control and processing associated with voice calls, data communications, and video calls. The controller 180 may perform pattern recognition processing to recognize a character or image from a handwriting input, or a picture drawing input, performed on the touch screen.

The controller 180 may include a multimedia module 181 for reproducing or playing back multimedia data. The multimedia module 181 may be integrated into the controller 180 or may be external to the controller 180.

The power supply unit 190 receives external power, via a power cable connection, or internal power, via a battery of the mobile terminal 100. The power supply unit 190 supplies power required for operating respective elements and components under the control of the controller 180.

The various components described herein may be implemented in a computer-readable medium using, for example, computer software, hardware, or any combination thereof.

For example, the components described herein may be implemented in hardware using, for example, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In other embodiments, such components may be implemented in the controller 180.

The procedures or functions described herein may be implemented in software using, for example, separate software modules that allow performing of at least one function or operation. Software codes can be implemented by a software application or program written in any suitable programming language. The software codes may be stored in the memory 160 and executed by the controller 180.

The mobile terminal 100 has been described from the perspective of its functions. Hereinafter, external elements of the mobile terminal 100 will be described from the perspective of their functions with reference to FIG. 2 and FIG. 3.

The mobile terminal 100 may be implemented in a variety of different configurations. Examples of such configurations include a folder-type, a bar-type, a swing-type, and a slide-type. The following description will primarily relate to a slide-type mobile terminal. However, such description can equally apply to other types of mobile terminals.

Figure 2:
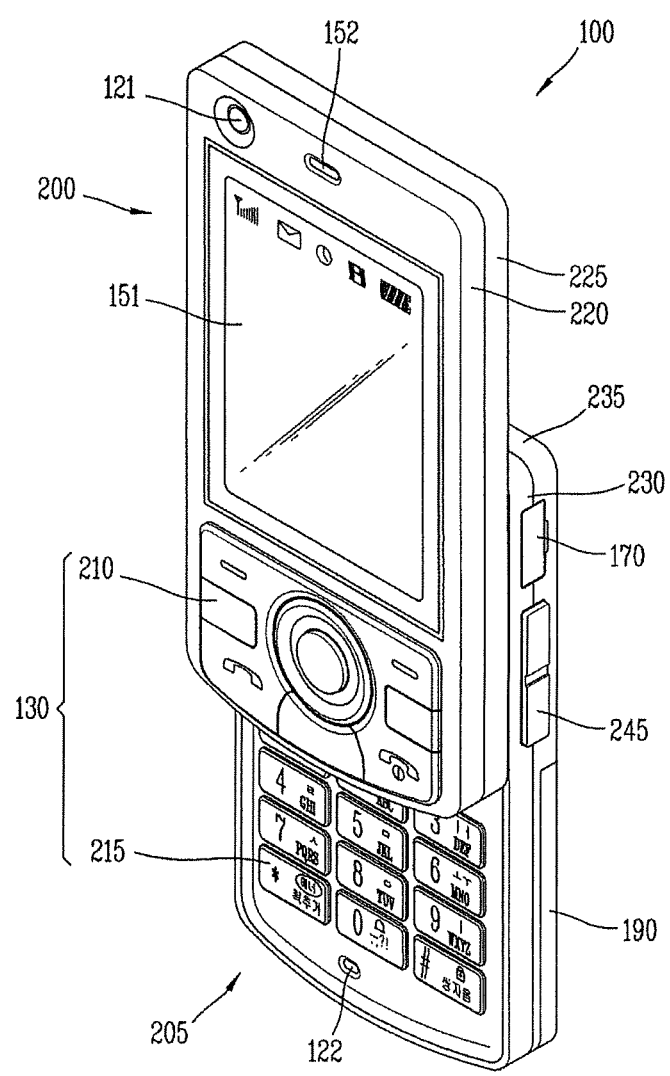
FIG. 2 is a front perspective view of a mobile terminal according to one embodiment of the present invention.

FIG. 2 is a front perspective view of the mobile terminal 100 according to one embodiment of the present invention. As shown in FIG. 2, the mobile terminal 100 includes a first body 200, and a second body 205 that is slidable in at least one direction with respect to the first body 200.

A state in which the first body 200 is disposed to overlap with the second body 205 may be called a closed configuration. As shown in FIG. 2, a state in which at least a portion of the second body 205 is exposed may be called an open configuration.

Although not shown, the mobile terminal 100 may be the folder-type mobile terminal including the first body 200 and the second body 205, where the second body can be folded or unfolded with respect to the first body. A state in which the second body 205 is folded may be called a closed configuration, and a state in which the second body is unfolded may be called an open configuration.

In addition, although not shown in FIG. 2, the mobile terminal 100 may be a swing-type mobile terminal including a first body 200 and a second body 205, where the second body is configured to swing with respect to the first body. A state in which the first body 200 is disposed to overlap with the second body 205 may be called a closed configuration, and a state in which the second body is swung to expose a portion of the first body may be called an open configuration.

The folder-type mobile terminal and the swing-type mobile terminal are well known in the art, and thus they will not be described in detail herein to maintain brevity.

In the closed configuration, the mobile terminal 100 mainly operates in a standby mode, which is also referred to in the art as an idle mode. The standby mode may be released upon user manipulation of the mobile terminal 100.

The mobile terminal 100 operates mainly in the calling mode in the open configuration. The calling mode can be changed to the standby mode with a lapse of time or upon user manipulation.

The case, otherwise referred to as the "casing," "housing," or "cover," constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225. The cases may be formed by injection-molding a synthetic resin, or may be made of a metallic material, such as stainless steel (STS) or titanium (Ti).

The display 151, the audio output module 152, the camera 121, or the first user input unit 210 may be situated on the first body 200, and specifically on the first front case 220 of the first body 200. The display 151 has been described with respect to FIG. 1.

The audio output unit 152 may be implemented as a speaker or other sound producing device. The camera 121 may be suitable for capturing images or video with respect to the user and other objects.

The case constituting the external appearance of the second body 205 may include a second front case 230 and a second rear case 235. A second user input unit 215 may be disposed on the second body 205, and specifically on the second front case 230 of the second body 205. A third user input unit 245, the microphone 122, and the interface unit 170 may be located on either the second front case 230 or the second rear case 235.

The first to third user input units 210, 215 and 245 may be included in the user input unit 130, and may generally be referred to as a manipulating unit. Various methods and techniques may be employed for the manipulation unit so long as they can be operated by the user in a tactile manner.

For example, the user input unit 130 can be implemented as dome switches, actuators, or touch pad regions that can receive user commands or information according to the user's touch operations, such as pressing, pushing, swiping, or using a drag-and-drop technique. The user input 130 can also be implemented as a control wheel or disc that may be rotated, keys or buttons, a jog dial, or a joystick.

The first user input unit 210 can be used for entering commands, such as start, end, and scroll. The second user input unit 215 is used for entering numbers, characters, and symbols. The first user input unit 210 may include a soft key used with corresponding icons displayed on the display 151, and a navigation key, which can include four direction keys and a central key, for indicating and checking directions. The third user input unit 245 may support hot key functions that allow convenient activation of particular functions for the mobile terminal 100.

The microphone 122 may be implemented to detect user voice inputs and other sounds.

The interface unit 170 may be used as a communication link, a passage, or a path through which the terminal can exchange data with an external device. The interface unit 170 has been described with respect to FIG. 1 above.

The power supply unit 190 for supplying power to the terminal may be located at the second rear case 235. The power supply unit 190 may be a rechargeable battery that can be detached.

Figure 3:
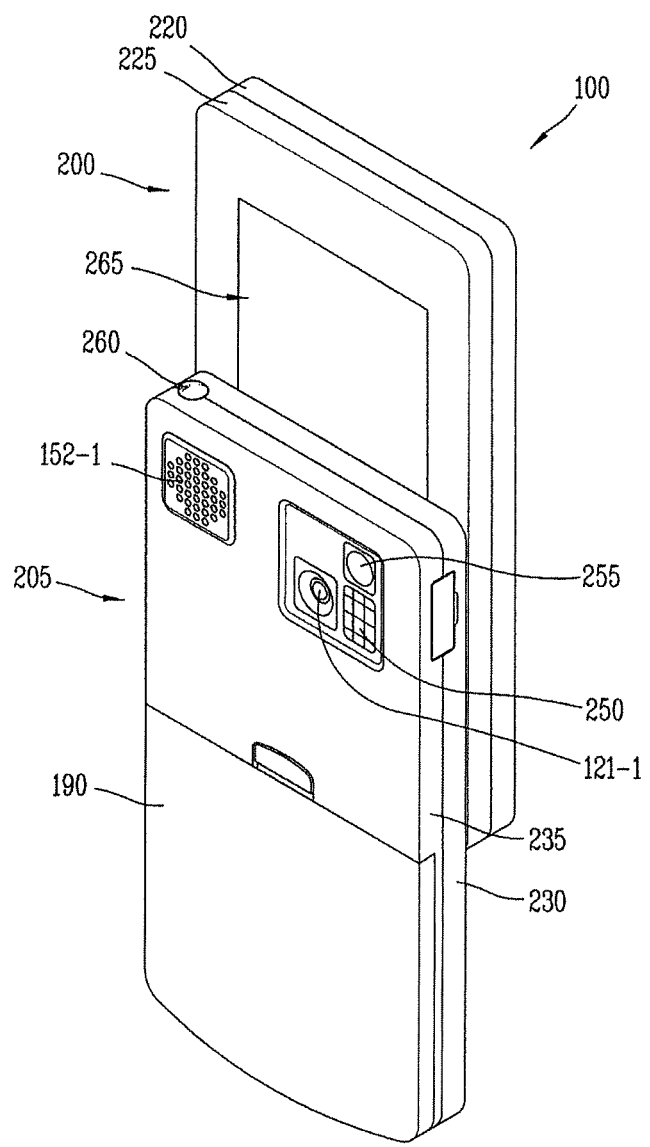
FIG. 3 is a rear perspective view of a mobile terminal according to one embodiment of the present invention.

FIG. 3 is a rear perspective view of the mobile terminal 100 according to one embodiment of the present invention. As shown in FIG. 3, a camera 121-1 or other image capture device may be located on a rear surface of the second rear case 235 of the second body 205. The camera 121-1 of the second body 205 may have a direction of view that is substantially opposite to a direction of view of the camera 121 of the first body 200.

For example, if camera 121 is positioned to view the front of the mobile terminal 100, then camera 121-1 is positioned to view the rear of the mobile terminal 100. Cameras 121 and 121-1 may have different resolutions with respect to one another.

For example, the camera 121 may operate with a relatively lower resolution than the camera 121-1 in order to capture an image of the user to allow immediate transmission of the image to another user in real-time during video call communications where reverse link bandwidth capabilities may be limited. Also, the camera 121-1 may operate with a relatively higher resolution than the camera 121 in order to capture images of general objects with high picture quality, which may not require immediate transmission in real-time, but may be stored for later viewing or use.

Additional camera related components, such as a flash 250 and a mirror 255, may be situated adjacent to the camera 121-1. When an image of the subject is captured with the camera 121-1, the flash 250 illuminates the subject. The mirror 255 allows self-image capturing by allowing the user to see himself when the user desires to capture his own image using the camera 121-1.

The second rear case 235 may further include an audio output module 152-1. The audio output module 152-1 of the second body 205 may support stereophonic sound functions in conjunction with the audio output module 152 of the first body 200 and may also be used for sending and receiving calls in a speaker phone mode.

A broadcast signal receiving antenna 260 may be located externally or internally at one side of the second rear case 235, in addition to an antenna used for mobile communications. The antenna 260 can also be configured to be retractable from the second body 205.

One part of a slide module 265 allowing the first body 200 and the second body 205 to slide relative to each other may be situated on the first rear case 225 of the first body 200. The other part of the slide module 265 may be situated on the second front case 230 of the second body 205, and thus not be exposed.

Although the camera 121-1 and various components in the embodiment of the invention shown in FIG. 3 are located on the second body 205, the camera 121-1 and the various components can be located at other parts of mobile terminal 100 in other embodiments.

For example, one or more components, such as the broadcast signal receiving antenna 260, the camera 121-1, the flash 250, and the audio output module 152-1, which are located on the second rear case 235, may be mounted on the first body 200, and more specifically on the first rear case 225. Accordingly, the components situated on the first rear case 225 can be protected by the second body 205 in the closed configuration. If a separate camera, such as camera 121-1, is not provided on the second body 205, the camera 121 may be configured to allow the user to orient the direction of the camera 121, thereby allowing the user to capture images in various directions.

The mobile terminal 100 of the present invention may be configured to operate with a communication system, which transmits data via frames or packets, such as wired and wireless communication systems, and satellite-based communication systems. The communication systems in which the mobile terminal 100 can operate will now be described with reference to FIG. 4.

Communication systems may use different air interfaces and/or physical layers. For example, air interfaces utilized by communication systems include, frequency division multiple access (FDMA), time division multiple access (TDMA), code division multiple access (CDMA), global system for mobile communications (GSM), universal mobile telecommunications system (UMTS), and long term evolution (LTE). Although the description hereafter relates to a CDMA communication system, it should be understood that other types of communication systems may be used without departing from the scope of the invention.

Figure 4:
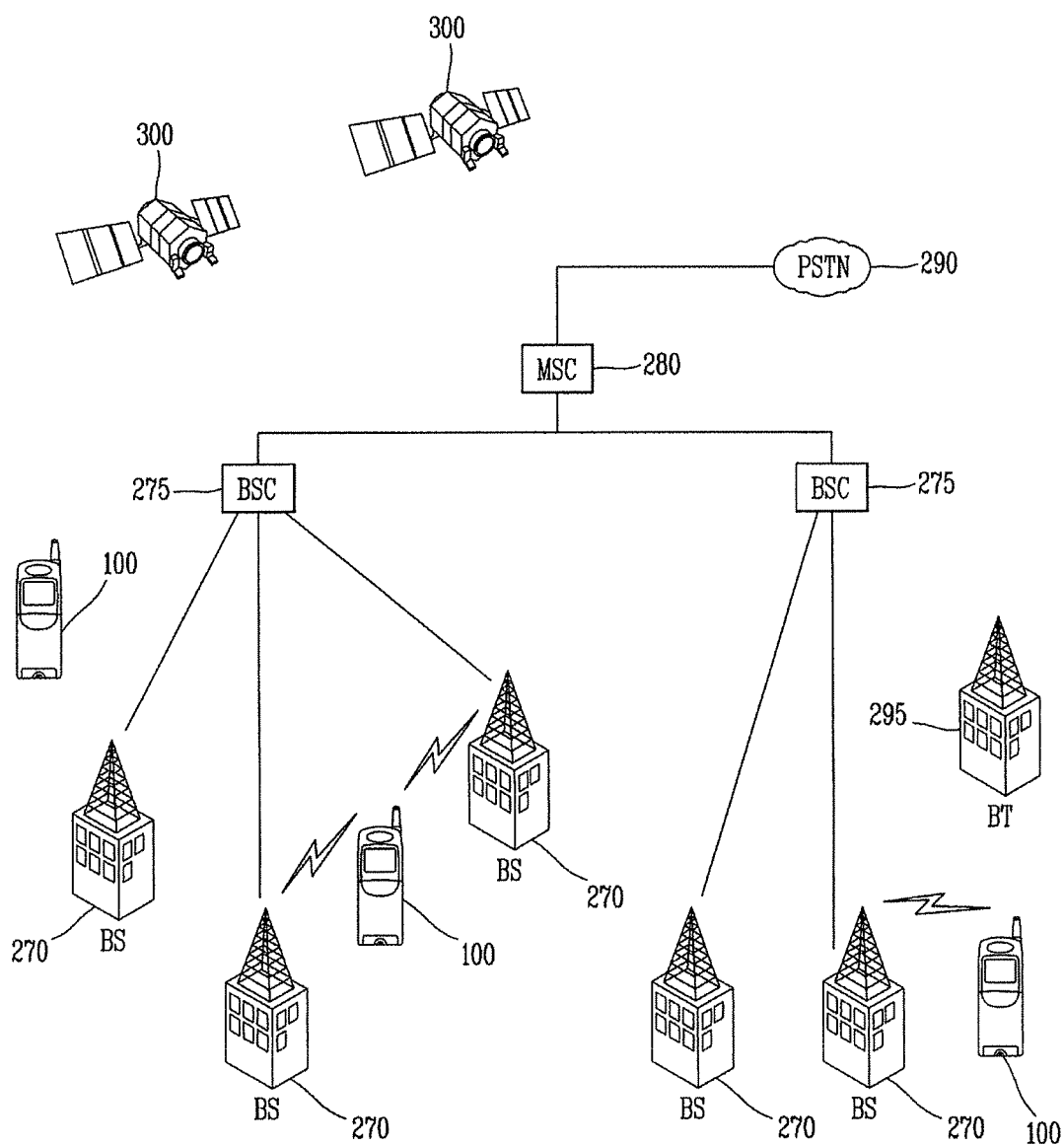
FIG. 4 is a wireless communication system according to one embodiment of the present invention.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switched telephone network (PSTN) 290. The MSC 280 is also configured to interface with the BSCs 275, which may be coupled to the BSs 270 via backhaul lines. The backhaul lines may be configured in accordance with any of several known interfaces, such as E1/T1, Asynchronous Transfer Mode (ATM), Internet Protocol (IP), Point-to-Point Protocol (PPP), Frame Relay, High bit rate Digital Subscriber Line (HDSL), Asymmetric Digital Subscriber Line (ADSL), or Digital Subscriber Line (xDSL).

Each BS 270 may serve one or more sectors (or regions), where each sector is covered by an omni-directional antenna or an antenna pointed in a particular direction radially away from the BS 270. Alternatively, each sector may be covered by two or more antennas for diversity reception. Each BS 270 may be configured to support a plurality of frequency assignments, each frequency assignment having a particular spectrum, such as 1.25 MHz or 5.0 MHz.

The intersection of a sector and frequency assignment may be referred to as a CDMA channel. The BSs 270 may also be referred to as "base station transceiver subsystems" (BTSs) or other equivalent terms. In such a case, the term "base station" may be used to collectively refer to a single BSC 275 and at least one BS 270. The base station may also be referred to as a "cell site." Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the communication system. The mobile terminal 100 can receive broadcast signals transmitted by the BT 295 via the broadcast receiving module 111 shown in FIG. 1.

FIG. 4 shows global positioning system (GPS) satellites 300. The GPS satellites 300 are used to locate at least one of a plurality of the mobile terminals 100. The location information module 115 shown in FIG. 1 is configured to cooperate with the GPS satellites 300 to obtain desired positioning information.

Although FIG. 4 shows two GPS satellites 300, it should be understood that positioning information may be obtained with any number of GPS satellites 300. Moreover, techniques for tracking using technologies other than, or in addition to, GPS technology may be used to determine the location of the mobile terminals 100. In addition, at least one of the GPS satellites 300 may selectively or additionally handle satellite DMB transmissions.

In one typical operation of the wireless communication system, the BSs 270 receive reverse-link signals from various mobile terminals 100 when the mobile terminals 100 are engaging in calls, messaging, and other types of communications. Each reverse-link signal received by a particular BS 270 is processed by that particular BS 270. The processed data is then forwarded to a BSC 275 associated with the BS 270.

The BSC 275 provides call resource allocation and mobility management functionality including the coordination of soft handoff procedures between the BSs 270. The BSCs 275 also route the received data to the MSC 280, where the MSC 280 provides additional routing services for interfacing with the PSTN 290. The PSTN 290 interfaces with the MSC 280, which interfaces with the BSCs 275. The BSCs 275 in turn control the BSs 270 to transmit forward-link signals to the mobile terminals 100.

A method for automatically geotagging image data in the mobile terminal 100 will now be described in accordance with one embodiment of the invention. Geotagging refers to a function that enables the storing of location information and/or time information with image data.

The controller 180 stores image data captured by the camera 121 or 121-1 in an exchangeable image file (EXIF) format. The EXIF format is an image file format used by digital cameras.

The EXIF format allows supplementary information, such as an image capture date, a time, a size of the image data, a resolution, and a format to be stored with the image data. The image data can be, for example, a photo or a video. Therefore, the controller 180 can advantageously manage the image data using the supplementary information. In addition, the EXIF format allows the storing of GPS related information, such as latitude and longitude information, an altitude reference, an altitude, a GPS time, an atomic time, and geodetic survey data.

When the controller 180 operates the camera 121 or 121-1, the controller concurrently operates the location information module 115. The location information module 115 determines location information, such as the geographic coordinates of the point where the mobile terminal 100 is located, and receives time information from GPS satellites.

Thus, when a user requests use of the camera 121 or 121-1 by providing an input through the user input unit 130, the controller 180 operates the camera and determines whether the geotagging function of the mobile terminal 100 has been enabled. If the geotagging function has been enabled, the controller 180 concurrently operates the location information module 115 and periodically receives location information from the location information module 115.

When the location information module 115 is operating, the controller 180 displays an indicator on the display 151 that indicates a status of the location information, or in other words, indicates whether the location information has been determined. In one embodiment of the invention, the indicator may be implemented as an icon.

In order to facilitate recognition of the icon by the user, the controller 180 can be configured to change the icon, to change the color of the icon, or to vary the manner in which the icon is displayed, according to the status of the location information. For example, the controller 180 can be configured to cause the icon to begin flashing at certain time intervals when the location information is being determined, and to stop flashing when the location information has been determined.

The controller 180 can be configured to inform the user whether location information has been determined when operating the location information module 115. For example, the controller 180 can display a notification message, such as "determining location," when the location information module 115 is operating, and the controller 180 can display another notification message, such as "location determined," when the location information has been determined.

Figure 5:
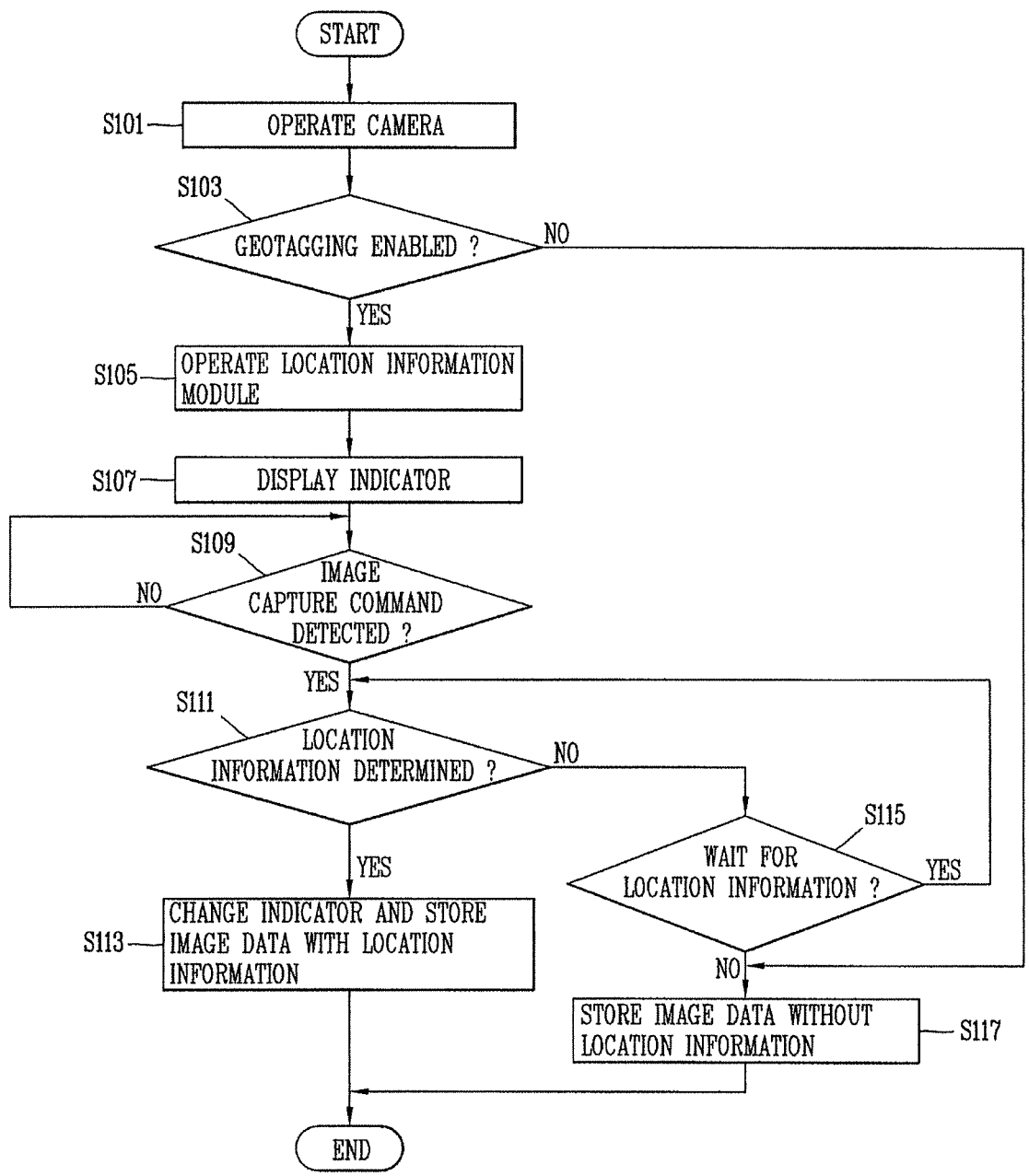
FIG. 5 shows a flow chart illustrating a method for automatically geotagging image data in a mobile terminal according to one embodiment of the present invention.

FIG. 5 shows a flow chart illustrating a method for automatically geotagging image data in the mobile terminal 100 according to one embodiment of the present invention. When a user inputs a camera function command via the user input unit 130, the controller 180 operates the camera 121 or 121-1 (S101). In one embodiment, the controller 180 can be configured to display an image capturing screen on the display 151 to allow capturing of an image.

When camera 121 or 121-1 is operated, the controller 180 determines whether the geotagging function has been enabled (S103). In one embodiment, the geotagging function can be enabled via an input through a main menu in a standby mode of the mobile terminal 100. In another embodiment, the geotagging function can be enabled via an input through a menu when the mobile terminal 100 is in an image capture mode. Therefore, the invention can allow the geotagging function to be enabled or disabled while image capturing is being performed.

If the geotagging function is enabled (S103), the controller 180 operates the location information module 115 (S105). Thereafter, the controller 180 displays an indicator based on a predetermined setting of the geotagging function (S107).

In one embodiment, the indicator may be implemented as an icon that indicates whether location information has been determined. For example, the controller 180 can be configured to change the displayed icon, or to change the color of the icon, to indicate whether the location information has been determined. The displaying of the indicator, or the manner in which the indicator is displayed, can be set when the geotagging function is enabled.

If the user desires to capture an image with the camera 121 or 121-1 when the indicator is displayed in the image capturing screen (S109), the controller 180 determines whether location information has been determined (S111). For example, if a user desires to capture an image and inputs an image capture command through the user input unit 130, the controller 180 determines whether location information has been determined by the location information module 115.

If the location information has been determined (S111), the controller 180 changes the indicator displayed in the image capturing screen, and stores the location information with the image data corresponding to the captured image (S113). In one embodiment, the controller 180 can display a notification message in the image capturing screen on the display 151 informing the user that the location information is being stored together with the image data.

If the location information has not been determined (S111), the controller 180 determines whether to wait for the location information to be determined according to a predetermined setting of the geotagging function (S115). In one embodiment, the controller 180 displays a message in the image capturing screen asking the user whether to wait for the location information to be determined. The controller 180 then determines to either wait or not to wait for the location information to be determined based on a response from the user.

If the controller 180 determines to wait for the location information to be determined (S115), the controller 180 again determines whether the location information has been determined (S111). Once the location information has been determined, the controller 180 changes the indicator and stores the location information with the image data (S113).

If the controller 180 determines not to wait for the location information to be determined (S115), the controller 180 stores the image data without the location information (S117). In one embodiment, the controller 180 may display a notification message informing the user that the image data has been stored without the location information.

When the user terminates the image capture function, the controller 180 ceases to operate the camera 121 or 121-1. The controller 180 then determines whether to cease operating the location information module 115 depending on whether the geotagging function has been enabled. For example, if the location information module 115 is being operated as a result of the geotagging function being enabled, the controller also ceases operating the location information module 115.

Figure 6A:
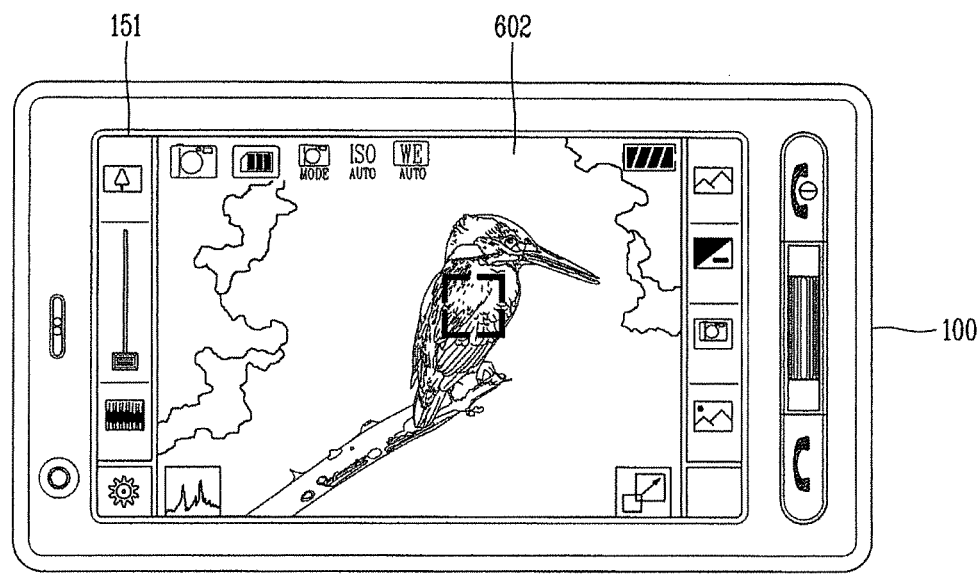
FIGS. 6A-6C illustrate an exemplary sequence of screens showing an enabling of a geotagging function of a mobile terminal according to one embodiment of the present invention.
Figure 6B:
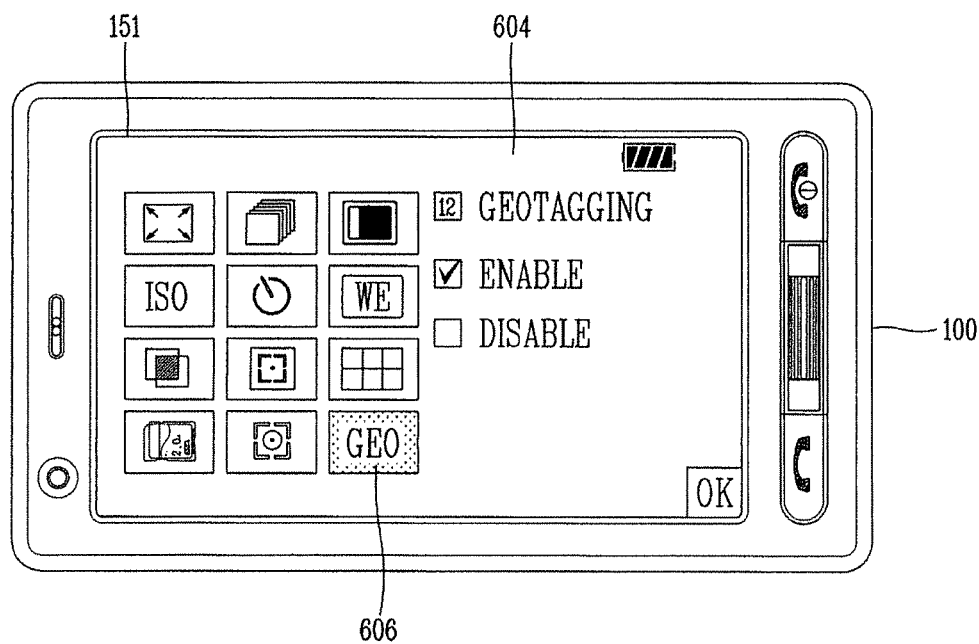
Figure 6C:
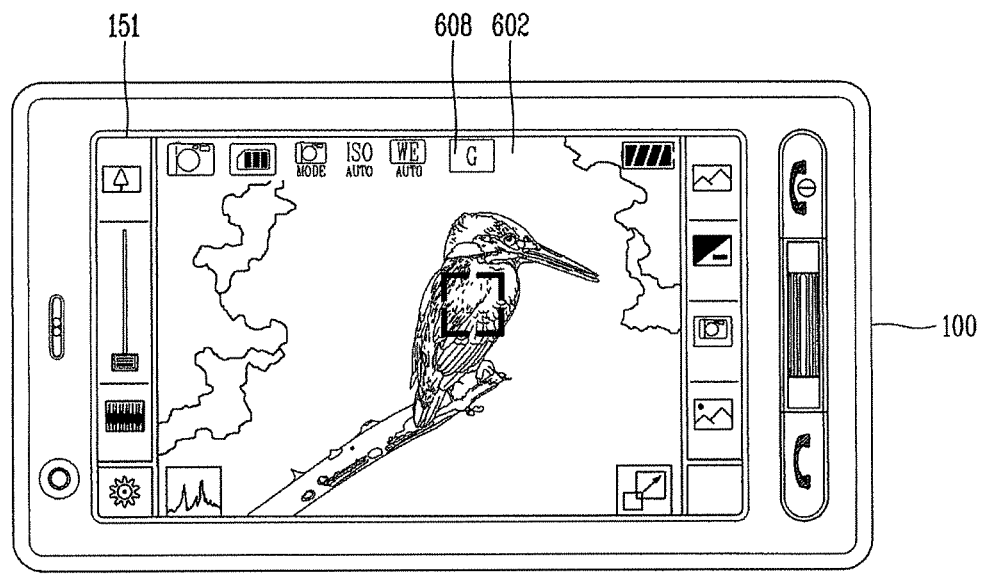

FIGS. 6A-6C illustrate an exemplary sequence of screens showing an enabling of a geotagging function of the mobile terminal 100 according to one embodiment of the present invention.

As shown in FIG. 6A, after a user inputs a camera function command via the user input unit 130, the controller 180 operates the camera 121 or 121-1 and displays an image capturing screen 602 for capturing an image on the display 151 of the mobile terminal 100. The user can then select a camera settings menu on the image capturing screen 602.

As shown in FIG. 6B, after the user selects the camera settings menu, the controller 180 displays the camera settings screen 604 on the display 151. The geotagging function 606 can be selected from the camera settings screen 604 and enabled by selecting the "ENABLE" option.

As shown in FIG. 6C, upon selecting the "ENABLE" option to enable the geotagging function, the controller 180 displays an indicator 608 in the image capturing screen 602 to inform the user that the geotagging function has been enabled. The indicator 608 allows the user to ascertain whether the geotagging function has been enabled or disabled.

Figure 7A:
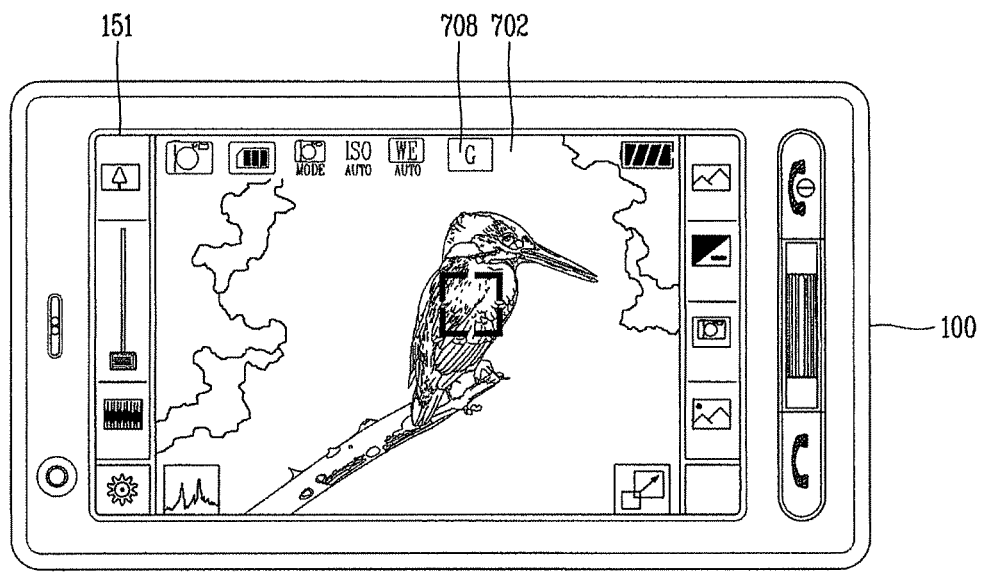
FIGS. 7A-7C illustrate an exemplary sequence of screens showing a disabling of a geotagging function of a mobile terminal according to one embodiment of the present invention.
Figure 7B:
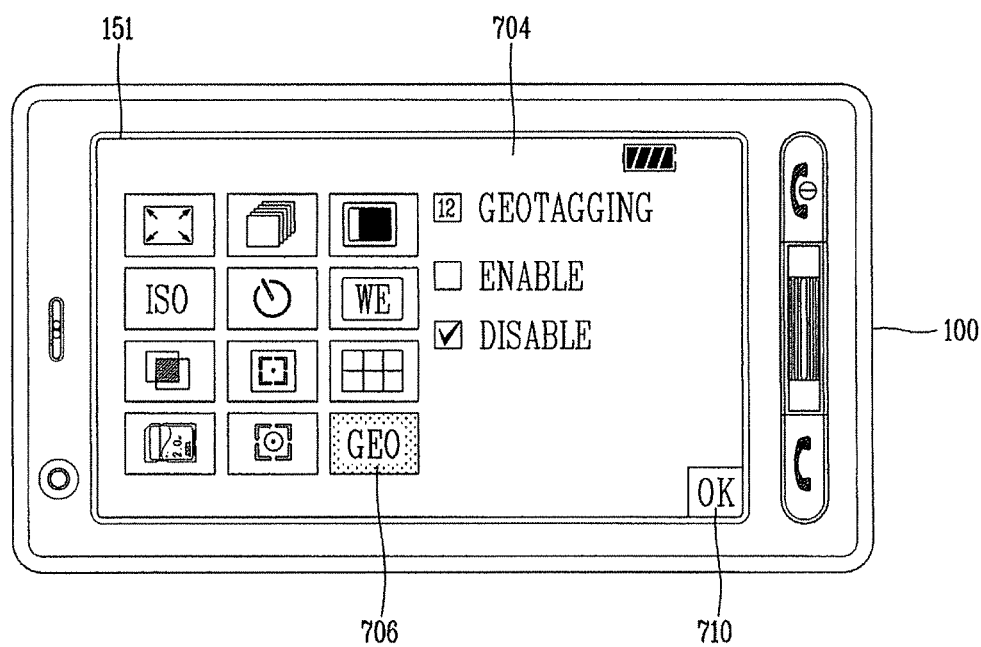
Figure 7C:
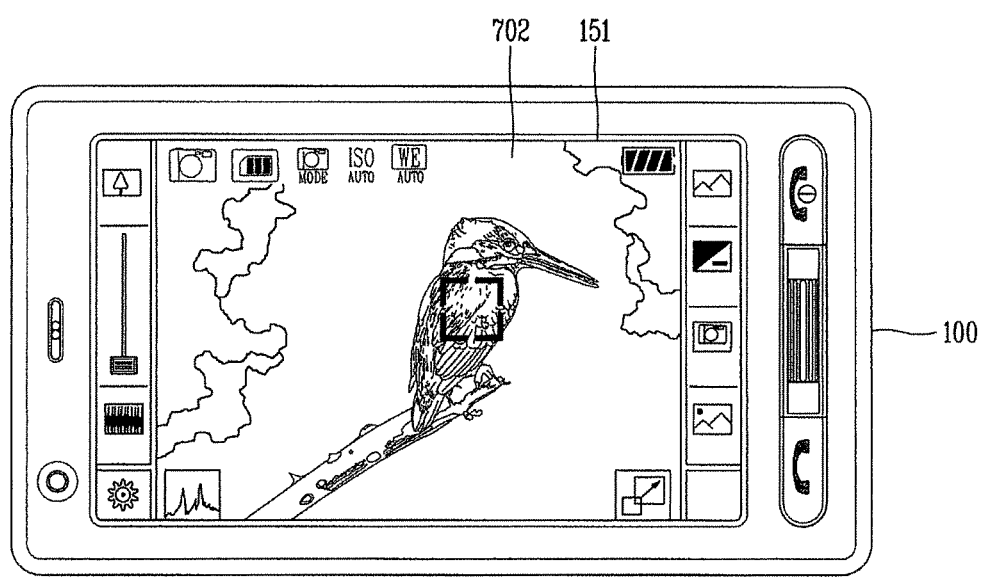

FIGS. 7A-7C illustrate an exemplary sequence of screens showing a disabling of a geotagging function in the mobile terminal 100 according to one embodiment of the present invention.

As shown in FIG. 7A, when the camera 121 or 121-1 is being operated, the controller 180 determines whether the geotagging function has been enabled or disabled using the camera settings information. If the geotagging function has been enabled, the controller 180 concurrently operates the location information module 115 with the camera 121 or 121-1, and displays an indicator 708 in the image capturing screen 702 on the display 151 to inform the user that the geotagging function is being executed.

If the user desires to disable the geotagging function, the user can provide an input to select a camera settings menu in the image capturing screen 702. The controller 180 then displays a camera settings screen 704 on the display 151, as shown in FIG. 7B. As also shown in FIG. 7B, the geotagging function 706 can be selected from the camera settings screen 704.

If the "DISABLE" option is selected on the camera settings screen 704 and an "OK" button 710 is selected, the controller 180 disables the geotagging function and stores the camera settings information in the memory 160. Thereafter, as shown in FIG. 7C, the controller 180 no longer displays the indicator 708 in the image capturing screen 702.

Figure 8A:
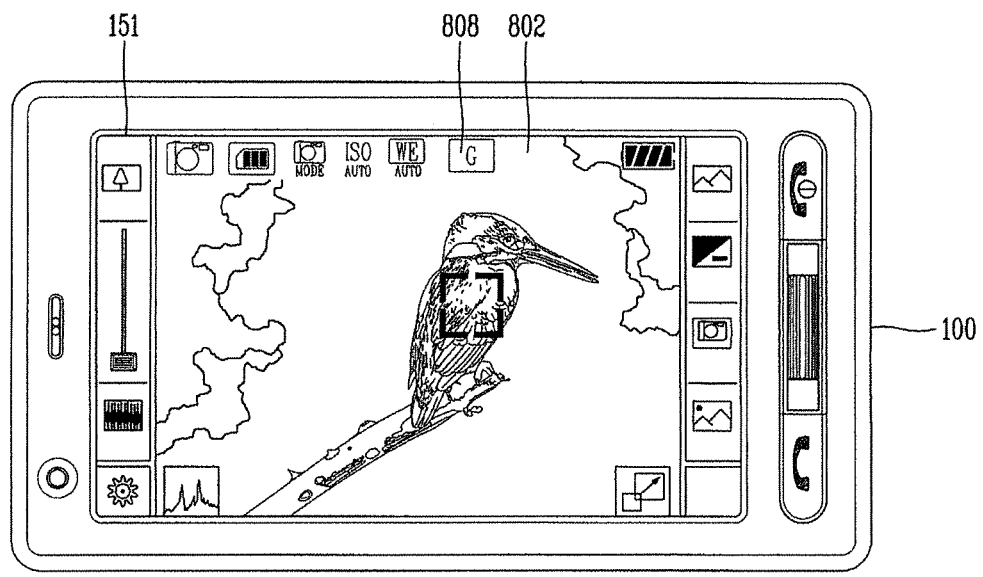
FIGS. 8A-8C illustrate an exemplary sequence of screens showing an operation of a geotagging function in a mobile terminal according to one embodiment of the present invention.
Figure 8B:
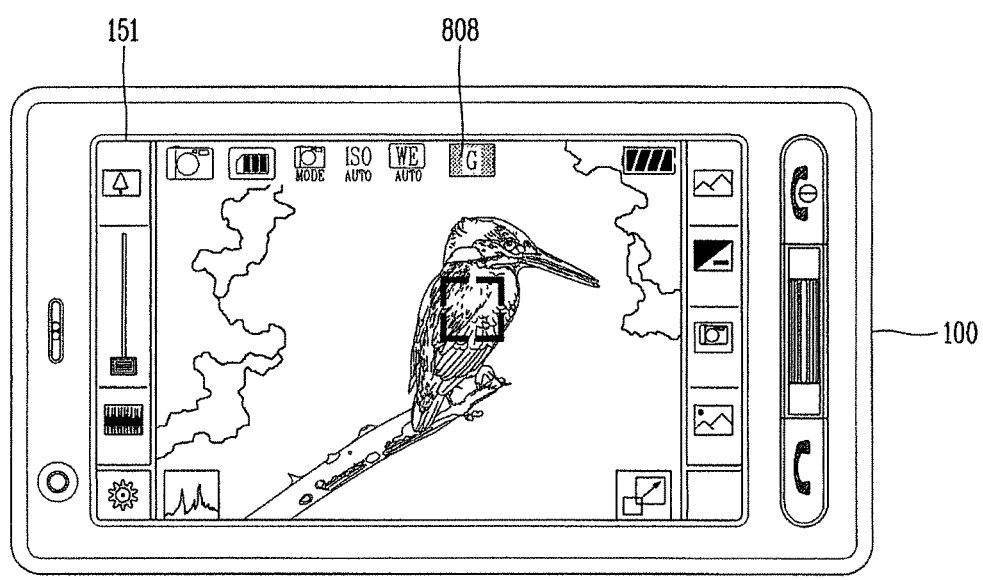
Figure 8C:
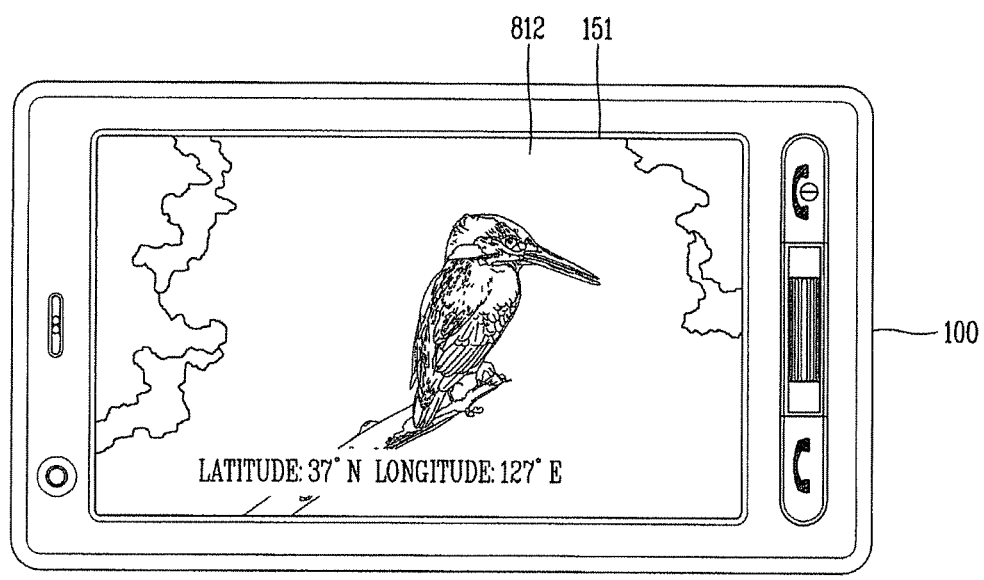

FIGS. 8A-8C illustrate an exemplary sequence of screens showing an operation of a geotagging function in the mobile terminal 100, according to one embodiment of the present invention.

As shown in FIG. 8A, after a user inputs a camera function command via the user input unit 130, the controller 180 operates the camera 121 or 121-1 and concurrently operates the location information module 115. The controller 180 displays a subject viewed by the camera 121 or 121-1 in the image capture screen 802 on the display 151. The controller 180 also displays an indicator 808 to inform the user that the geotagging function has been enabled.

As shown in FIG. 8B, after location information module 115 determines the location information, the controller 180 changes the displayed indicator 808. For example, the indicator 808 can have a red color during a period when the location information is being determined, and can have a green color when the location information has been determined.

As shown in FIG. 8C, after the location information has been determined and an image capture command has been input by the user, the controller 180 "tags" the location information to the image data generated by the camera 121 or 121-1. In other words, the controller 180 stores the location information with the image data generated by the camera 121 or 121-1. The controller 180 can display a preview of the tagged image data in a preview image data screen 812, thereby displaying both the image data and the location information to the user.

Figure 9A:
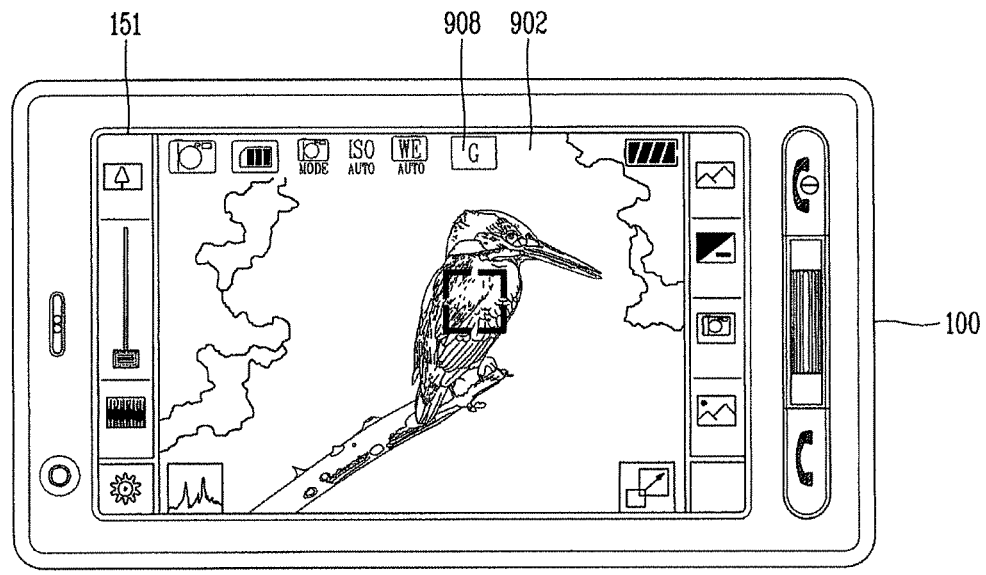
FIGS. 9A-9C illustrate an exemplary sequence of screens showing an operation of a geotagging function in a mobile terminal according to one embodiment of the present invention.
Figure 9B:
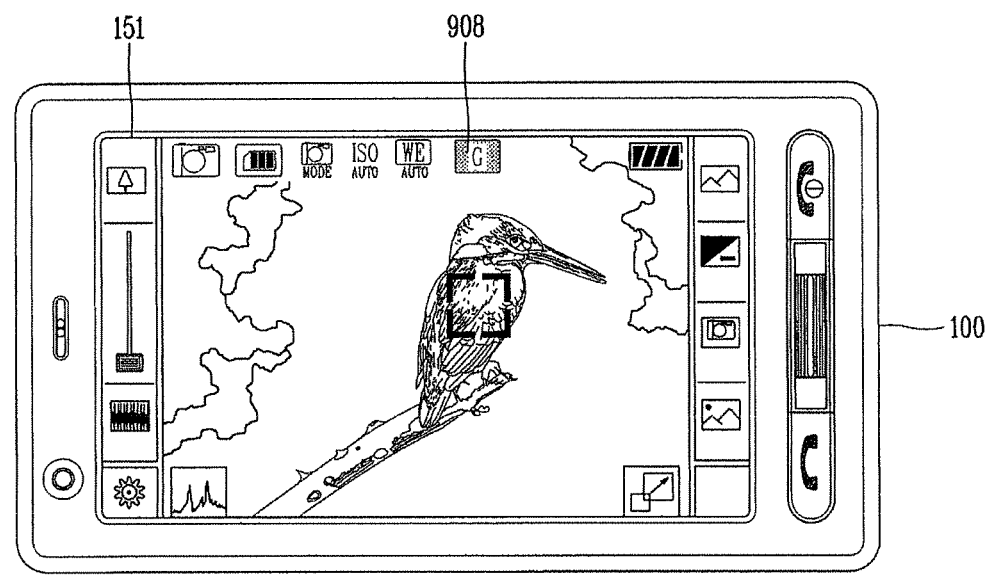
Figure 9C:
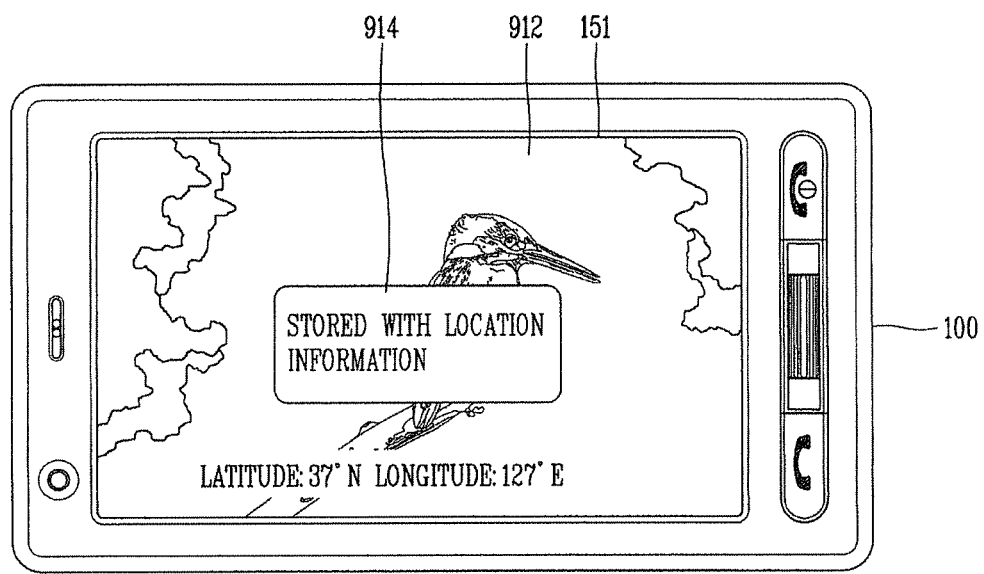

FIGS. 9A-9C illustrate an exemplary sequence of screens showing an operation of a geotagging function in the mobile terminal 100, according to one embodiment of the present invention.

As shown in FIG. 9A, after a user inputs a camera function command via the user input unit 130, the controller 180 operates the camera 121 or 121-1 and concurrently operates the location information module 115. The controller 180 displays a subject viewed by the camera 121 or 121-1 in the image capture screen 902 on the display 151, as well as an indicator 908.

As shown in FIG. 9B, after location information module 115 determines the location information, the controller 180 changes the displayed indicator 908. As shown in FIG. 9C, after the location information has been determined and an image capture command has been input by the user, the controller 180 performs the geotagging function of the invention, to store the location information with the image data corresponding to the captured image.

The controller 180 can display a notification message 914 in the preview image data screen 912 on the display 151, such as "STORED WITH LOCATION INFORMATION," to inform the user that the location information has been stored together with the image data. As shown in FIG. 9C, the controller 180 can display the notification message 914 together with the tagged image data in the preview image data screen 912.

Figure 10A:
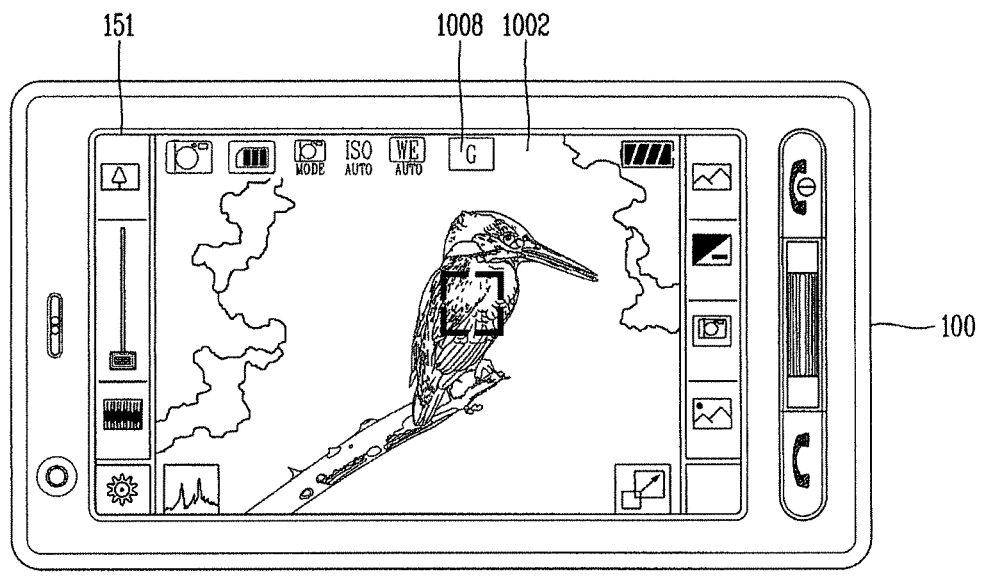
FIGS. 10A-10C illustrate an exemplary sequence of screens showing an operation of a geotagging function in a mobile terminal according to one embodiment of the present invention.
Figure 10B:
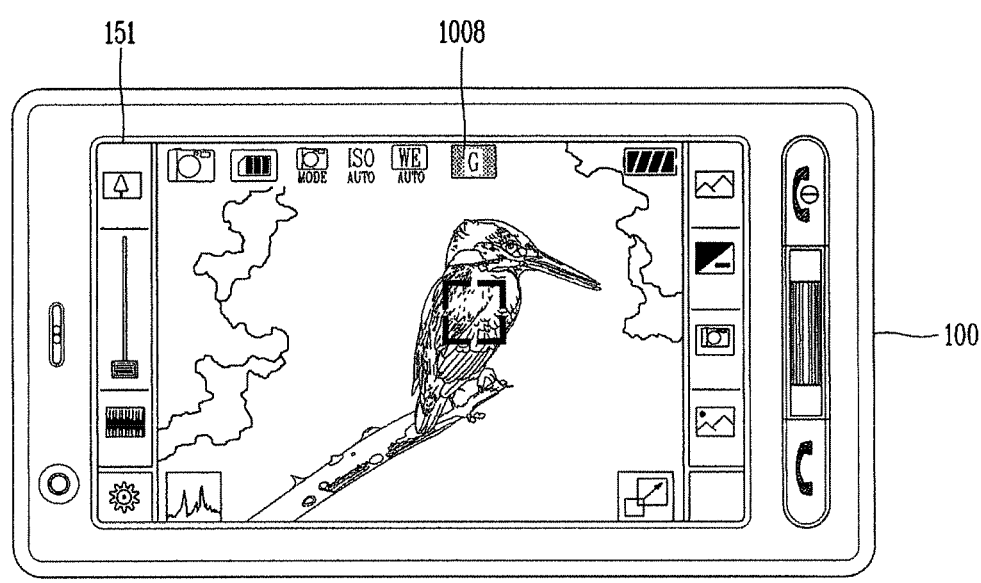
Figure 10C:
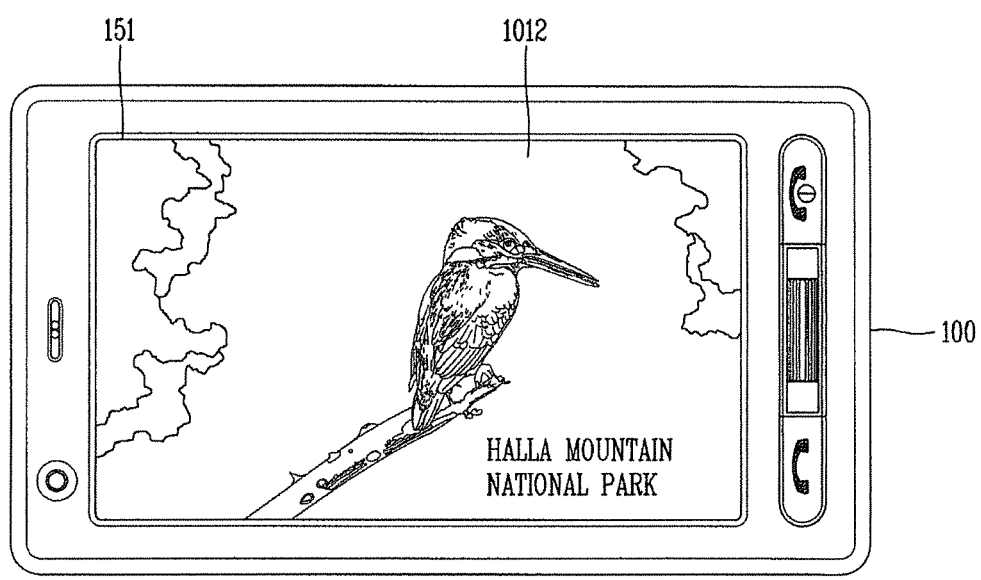

FIGS. 10A-10C illustrate an exemplary sequence of screens showing an operation of a geotagging function in the mobile terminal 100, according to one embodiment of the present invention.

As shown in FIG. 10A, after a user inputs a camera function command via the user input unit 130, the controller 180 operates the camera 121 or 121-1 and concurrently operates the location information module 115. The controller 180 displays a subject viewed by the camera 121 or 121-1 on the image capture screen 1002. The controller 180 also displays an indicator 1008 to inform the user of the status of the location information, specifically whether the location information has been determined by the location information module 115.

As shown in FIG. 10B, after the location information has been determined, the controller 180 changes the indicator 1008. If an image capture command is input by the user via the user input unit 130 after the location information has been determined, the controller 180 causes the camera 121 or 121-1 to capture an image and to generate image data.

As shown in FIG. 10C, the controller 180 then tags geographical information corresponding to the determined location information to the image data. In other words, the controller 180 stores the geographical information with the image data.

The geographical information may comprise the name of a place, an address, the name of a building, or the name of a road. The controller 180 can display a preview of the image data in a preview image data screen 1012, thereby displaying both the image data and the geographical information to the user.

In one embodiment, the controller 180 can determine the geographical information by accessing a map information database stored in an internal or external memory 160, in an external terminal 100, or on a server. If updated geographical information is required because the user has moved to a different location, updated geographical information may be received from the external terminal 100 or the server using wireless communications. For example, the geographical information corresponding to the location information determined by the location information module 115 can be received by wireless communication with a geographical information system (GIS).

FIGS. 11A-11D illustrate an exemplary sequence of screens showing an operation of a geotagging function in the mobile terminal 100, according to one embodiment of the present invention.

Figure 11A:
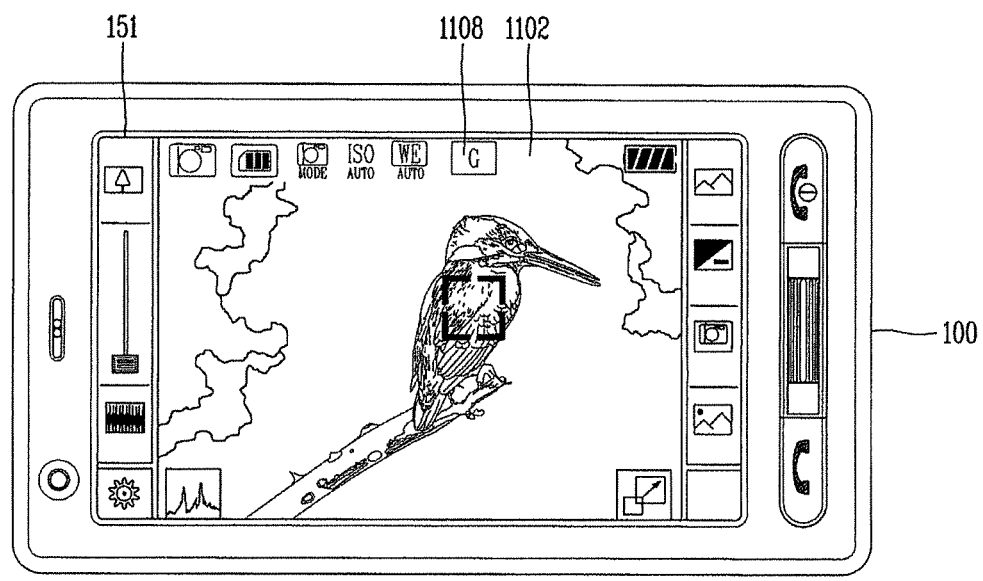
FIGS. 11A-11D illustrate an exemplary sequence of screens showing an operation of a geotagging function in a mobile terminal according to one embodiment of the present invention.

As shown in FIG. 11A, if the user inputs a camera function command via the user input unit 130, the controller 180 operates the camera 121 or 121-1 and concurrently operates the location information module 115. The controller 180 then displays an image capturing screen 1102 on the display 151 and an indicator 1108 informing the user that the location information module 115 is being operated. The indicator 1108 allows the user to ascertain whether the geotagging function has been enabled and whether location information has been determined.

Figure 11B:
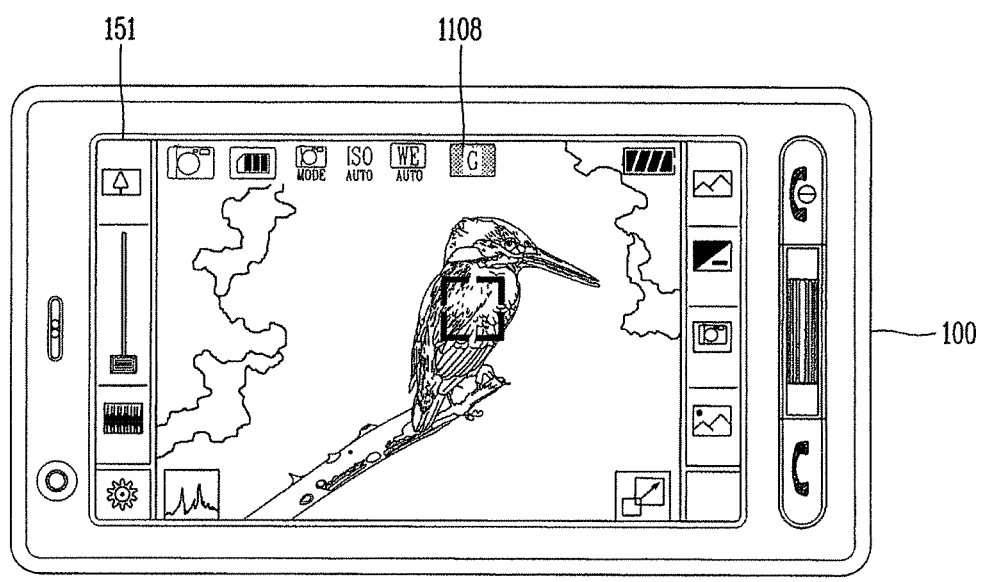

As further shown in FIG. 11B, after location information has been determined by the location information module 115, the controller 180 changes the displayed indicator 1108. For example, the controller 180 may change the color of the indicator 1108, or if the indicator 1108 is implemented as an icon, the controller 180 may change the icon.

Figure 11C:
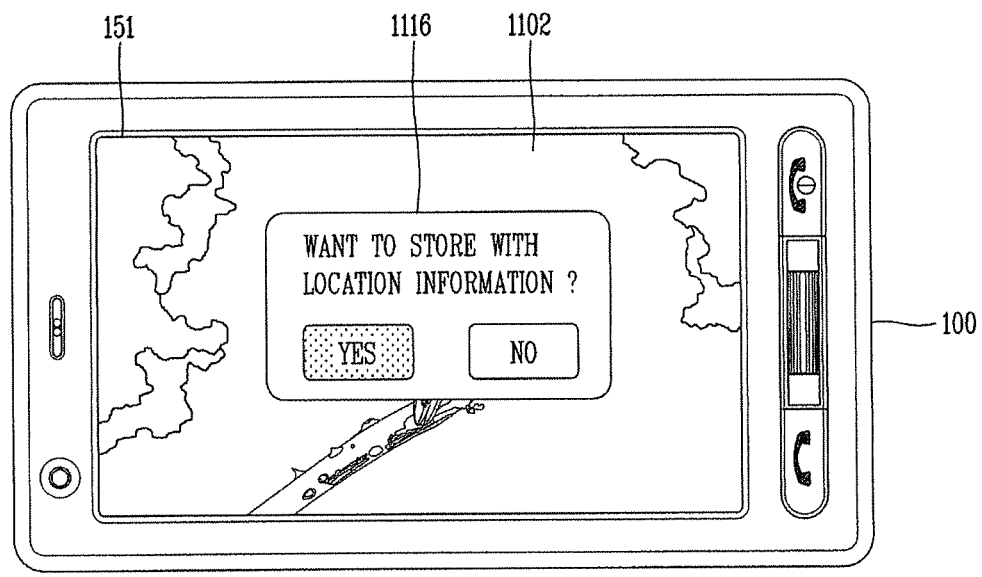

As shown in FIG. 11C, if a user inputs an image capture command via the user input unit 130 after the location information has been determined, the controller 180 displays a message 1116 in an image capture screen 1102 on the display 151 asking the user as to whether or not the image data should be stored with the location information. The controller 180 determines whether to store the image data with the location information based on a response from the user.

Figure 11D:
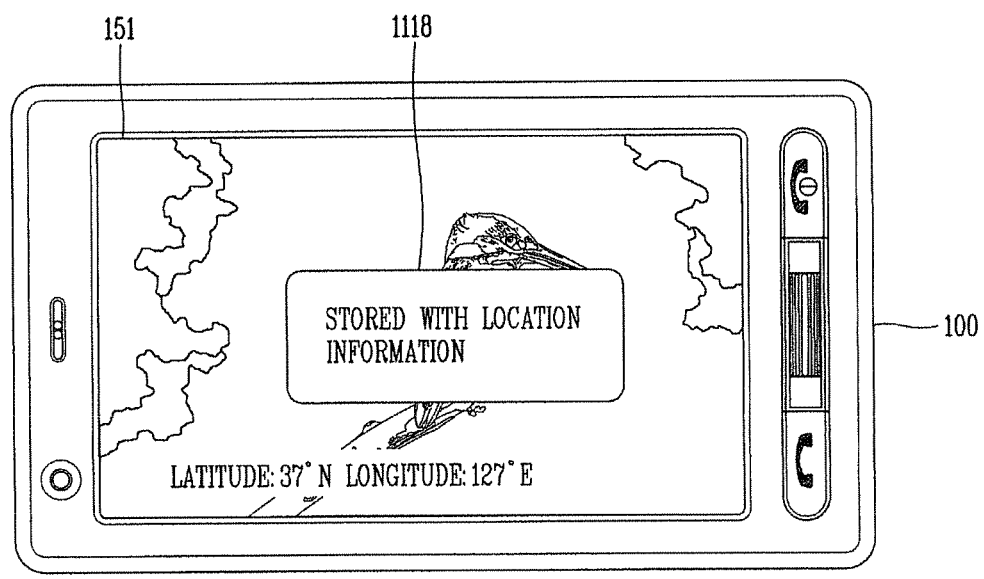

For example, if the user selects "YES" in response to the message 1116, the controller 180 tags the location information to the image data, or in other words, stores the location information with the image data. If the user selects "NO" in response to the message 1116, the controller 180 stores the image data without the location information. In one embodiment, as shown in FIG. 11D, the controller 180 displays a notification message 1118 to notify the user that the image data has been stored with the location information.

FIGS. 12A-12D illustrate an exemplary sequence of screens showing an operation of a geotagging function in the mobile terminal 100, according to one embodiment of the present invention.

Figure 12A:
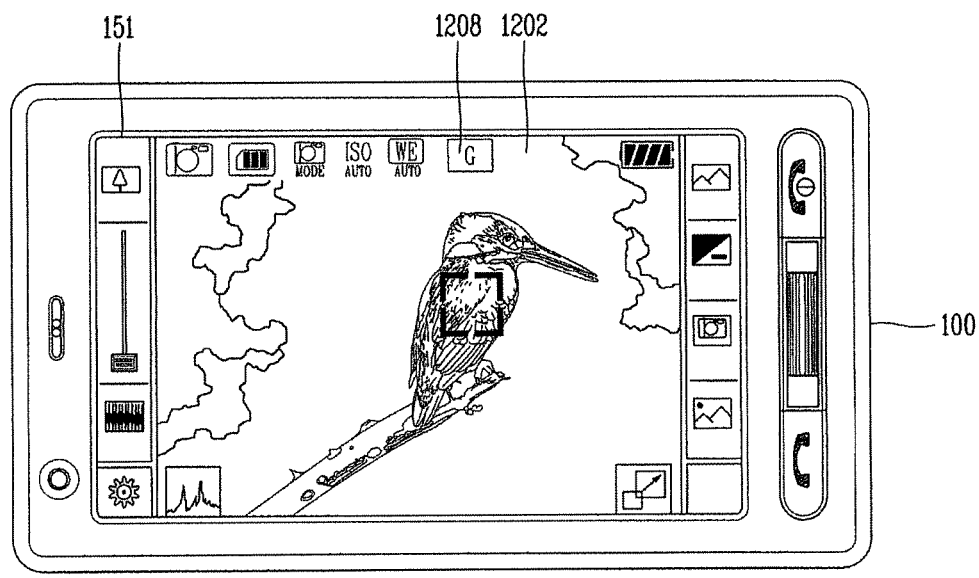
FIGS. 12A-12D illustrate an exemplary sequence of screens showing an operation of a geotagging function in a mobile terminal according to one embodiment of the present invention.

As shown in FIG. 12A, after the user inputs a camera function command via the user input unit 130, the controller 180 operates the camera 121 or 121-1 and concurrently operates the location information module 115. As also shown in FIG. 12A, controller 180 displays an image capturing screen 1202 on the display 151, and also displays indicator 1208 informing the user that the geotagging function has been enabled.

Figure 12B:
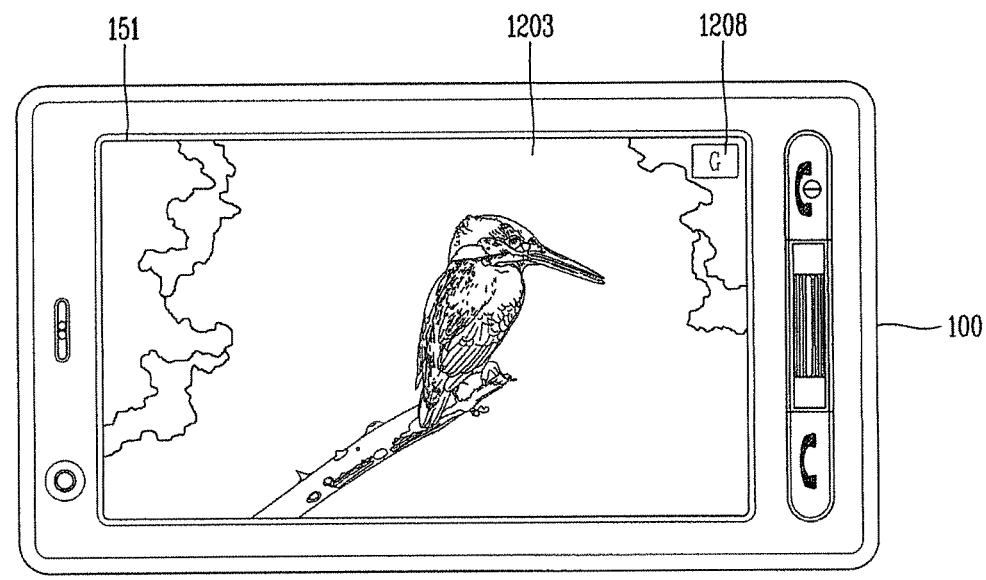

As shown in FIG. 12B, if the user inputs an image capture command via the user input unit 130 before the location information has been determined by the location information module 115, the controller 180 displays a preview of the image data in a preview image data screen 1203. In one embodiment, the controller 180 displays the indicator 1208 in the preview image data screen 1203 to inform the user of the status of the location information being determined by the location information module 115.

Figure 12C:
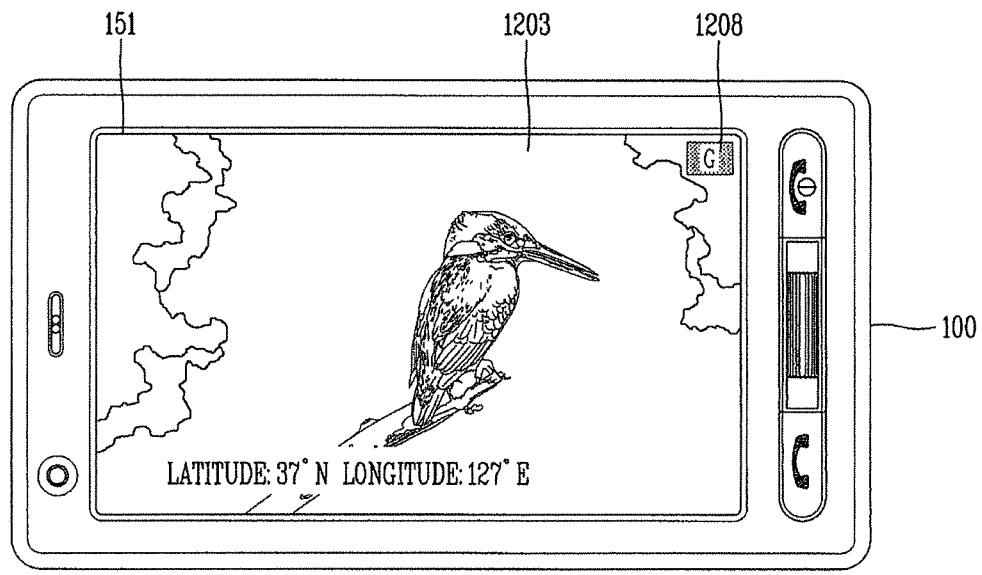

As shown in FIG. 12C, after the location information has been determined, the controller 180 changes the indicator 1208 to reflect a determination of the location information by the location information module 115. The controller 180 then tags the location information to the image data, or in other words, stores the location information with the image data displayed in the preview image screen 1203.

Figure 12D:
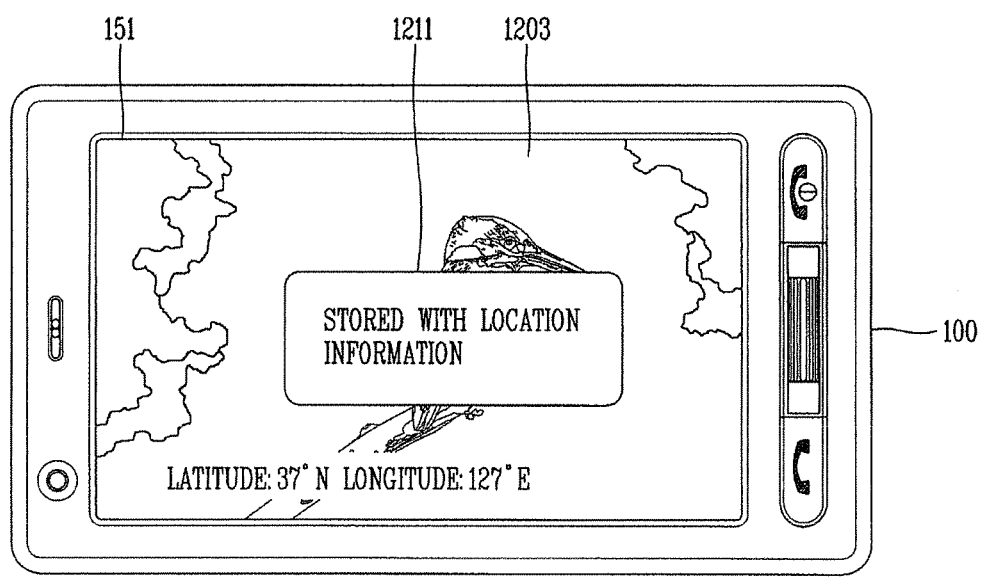

As shown in FIG. 12D, after the controller 180 stores the image data with the location information, controller 180 displays a notification message 1211 in preview image screen 1203 to inform the user that the location information has been stored with the image data.

FIGS. 13A-13D illustrate an exemplary sequence of screens showing an operation of a geotagging function in the mobile terminal 100, according to one embodiment of the present invention.

Figure 13A:
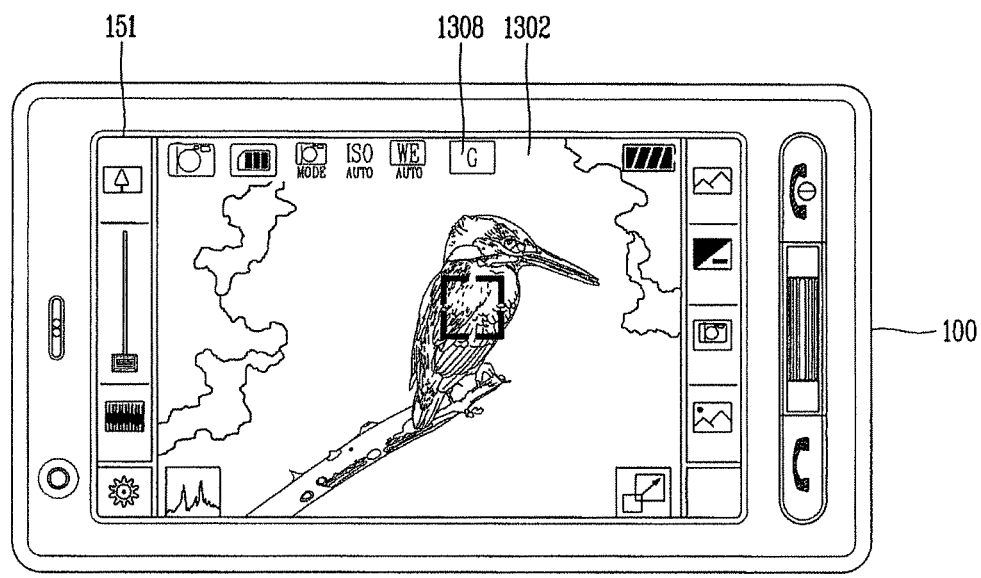
FIGS. 13A-13D illustrate an exemplary sequence of screens showing an operation of a geotagging function in a mobile terminal according to one embodiment of the present invention.

After the user inputs a camera function command via the user input unit 130, the controller 180 operates the camera 121 or 121-1 and concurrently operates the location information module 115. As shown in FIG. 13A, the controller 180 displays an image capturing screen 1302 and an indicator 1308, to inform the user that the geotagging function has been enabled.

Figure 13B:
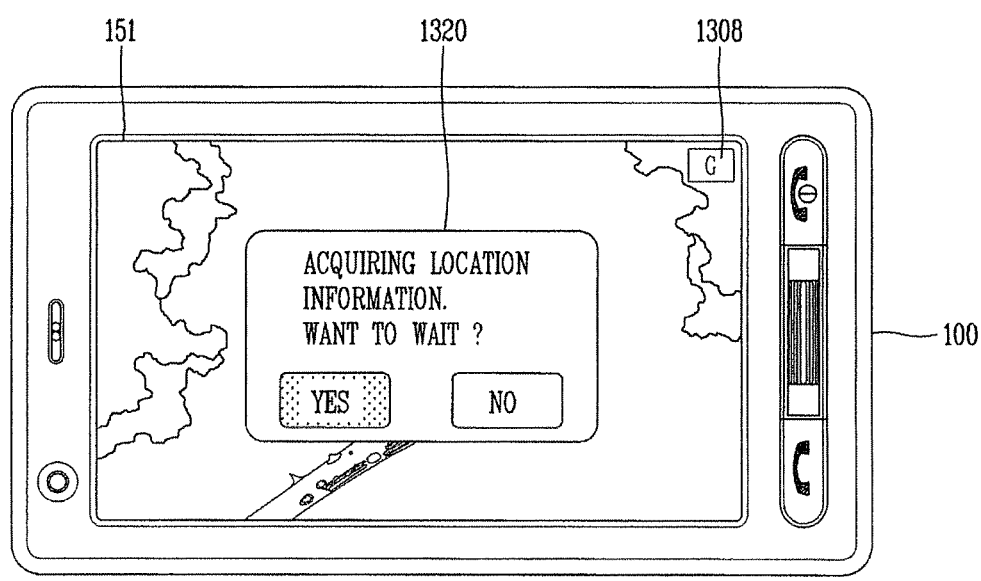

As shown in FIG. 13B, if the user inputs an image capture command via the user input unit 130 before the location information has been determined by the location information module 115, the controller 180 displays a message 1320 notifying the user that the location information has not been determined. The message 1320 also asks the user whether to wait for the location information to be determined.

The controller 180 receives a response to the message 1320 input by the user via the user input unit 130. If the user desires to wait for the location information to be determined, the controller 180 waits for the location information to be determined by the location information module 115.

Figure 13C:
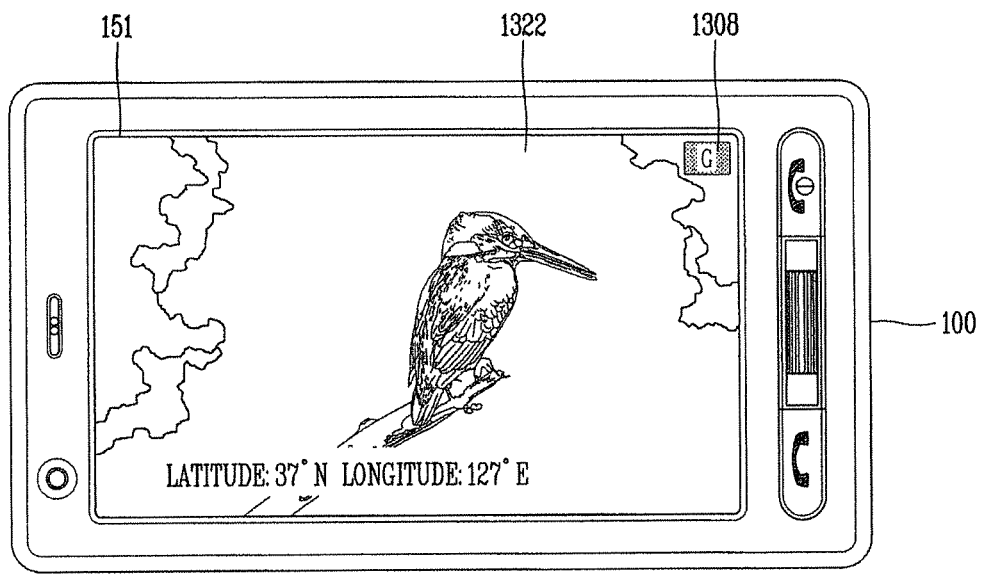

As shown in FIG. 13C, after the location information has been determined by the location information module 115, the controller 180 tags the location information to the image data displayed in a preview image data screen 1322. The controller 180 also changes the indicator 1308 to inform the user that the location information has been determined.

Figure 13D:
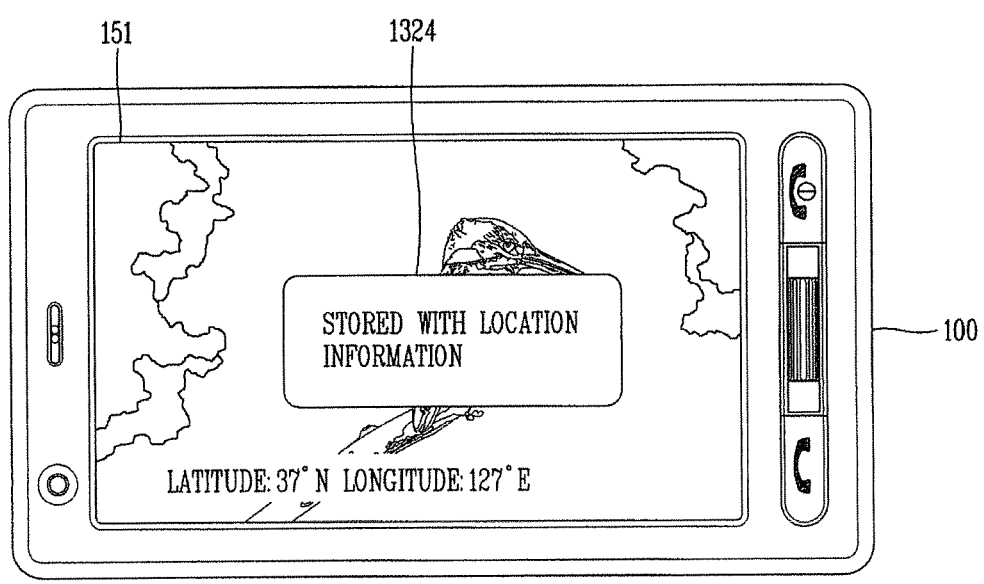

The controller 180 stores the location information with the image data. As shown in FIG. 13D, the controller 180 displays a notification message 1324 to inform the user that the location information has been stored with the image data.

Figure 14A:
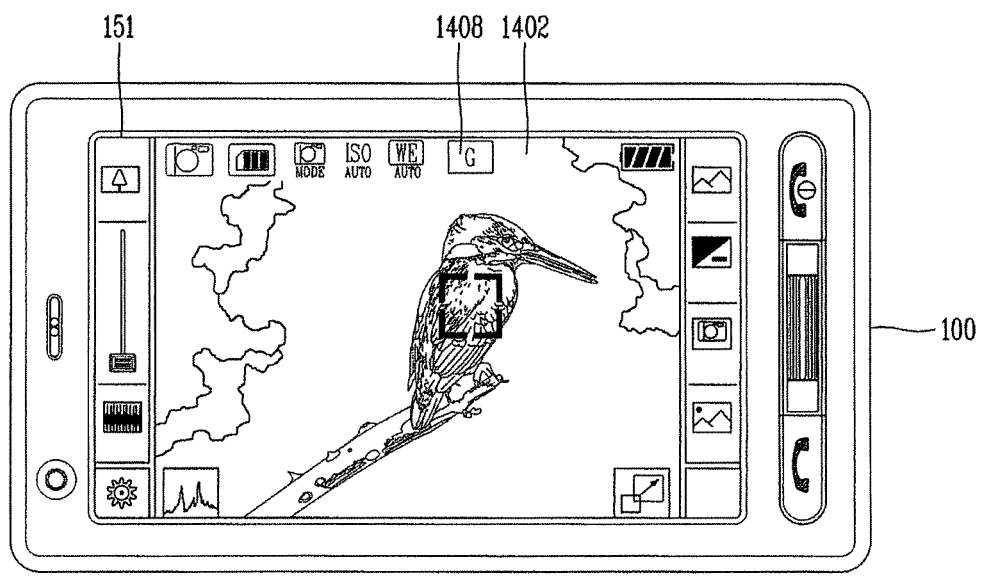
FIGS. 14A and 14B illustrate an exemplary sequence of screens showing an operation of a geotagging function in a mobile terminal according to one embodiment of the present invention.
Figure 14B:
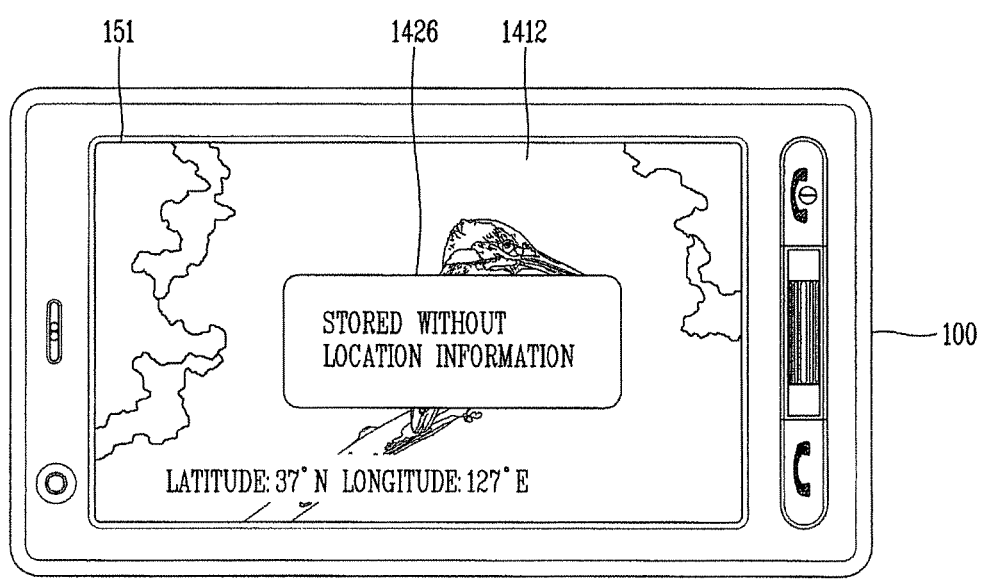

FIGS. 14A and 14B illustrate an exemplary sequence of screens showing an operation of a geotagging function in the mobile terminal 100, according to one embodiment of the present invention.

After the user inputs a camera function command via the user input unit 130, the controller 180 operates the camera 121 or 121-1 and concurrently operates the location information module 115. As shown in FIG. 14A, the controller 180 displays an image capturing screen 1402 on the display 151, as well as an indicator 1408 informing the user that the geotagging function has been enabled.

As shown in FIG. 14B, if the user inputs an image capture command via the user input unit 130 before the location information has been determined by the location information module 115, the controller 180 stores the image data without location information. As also shown in FIG. 14B, the controller displays a message 1426 in a preview image data screen 1412 to inform the user that the image data was stored without the location information.

FIGS. 15A-15E illustrate an exemplary sequence of screens showing an operation of a geotagging function in the mobile terminal 100, according to one embodiment of the present invention.

Figure 15A:
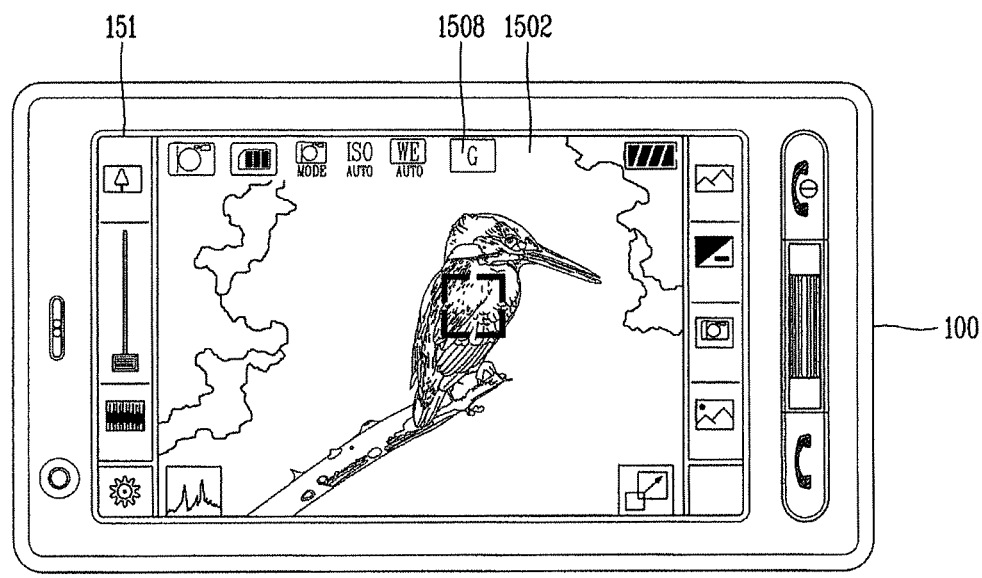
FIGS. 15A-15E illustrate an exemplary sequence of screens showing an operation of a geotagging function in a mobile terminal according to one embodiment of the present invention.
Figure 15B:
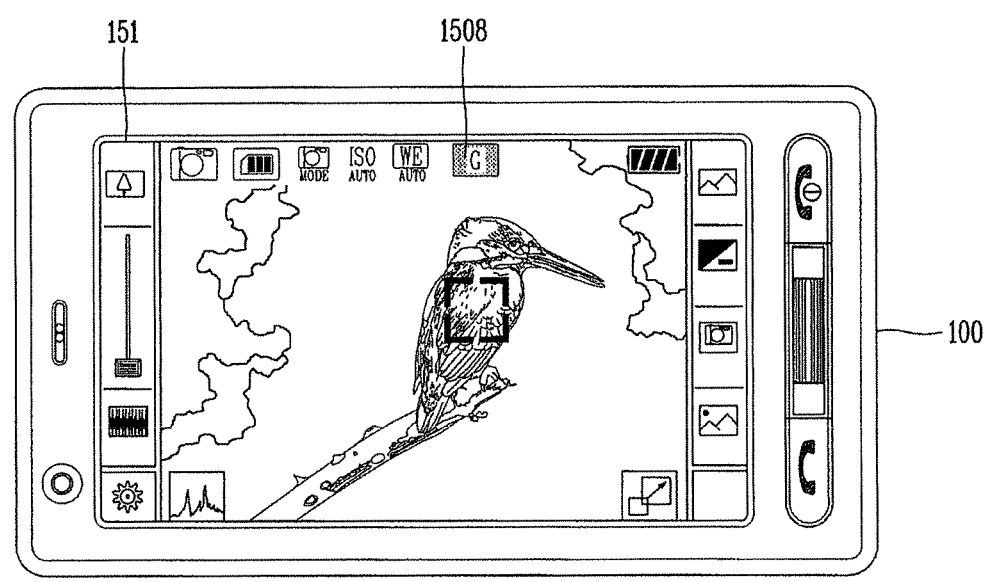

After the user inputs a camera function command via the user input unit 130, the controller 180 operates the camera 121 or 121-1 and concurrently operates the location information module 115. As shown in FIG. 15A, the controller 180 displays an image capturing screen 1502 and an indicator 1508. The indicator 1508 informs the user of a status of the location information, or in other words, whether the location information has been determined by the location information module 115. As shown in FIG. 15B, if the location information module 115 determines the location information, the controller 180 changes the indicator 1508.

Figure 15C:
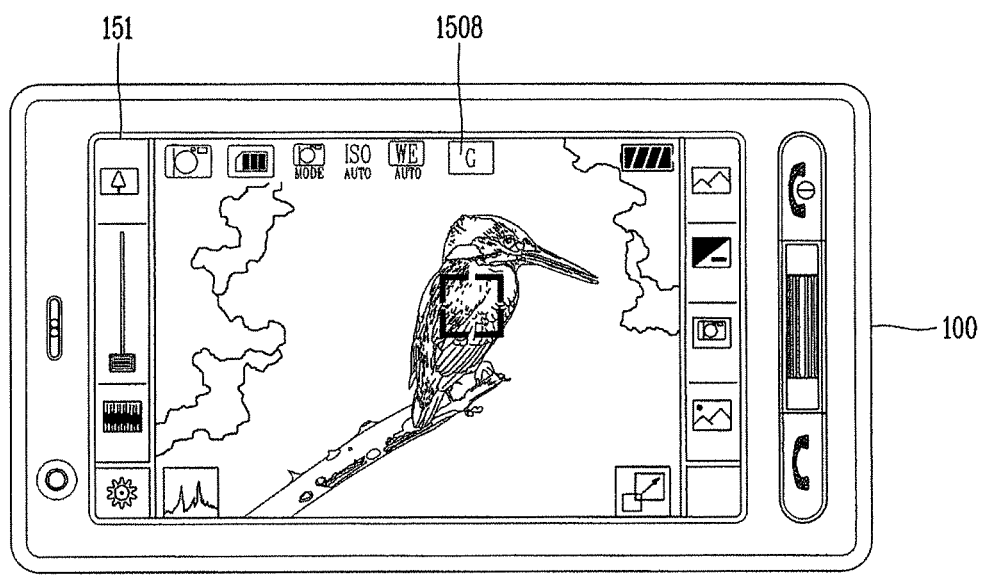

As shown in FIG. 15C, if the mobile terminal 100 is moved to a different location, the controller 180 operates the location information module 115 to determine the location information corresponding to the different location. As also shown in FIG. 15C, the controller 180 then changes the indicator 1508 to reflect that location information is being determined for the different location.

Figure 15D:
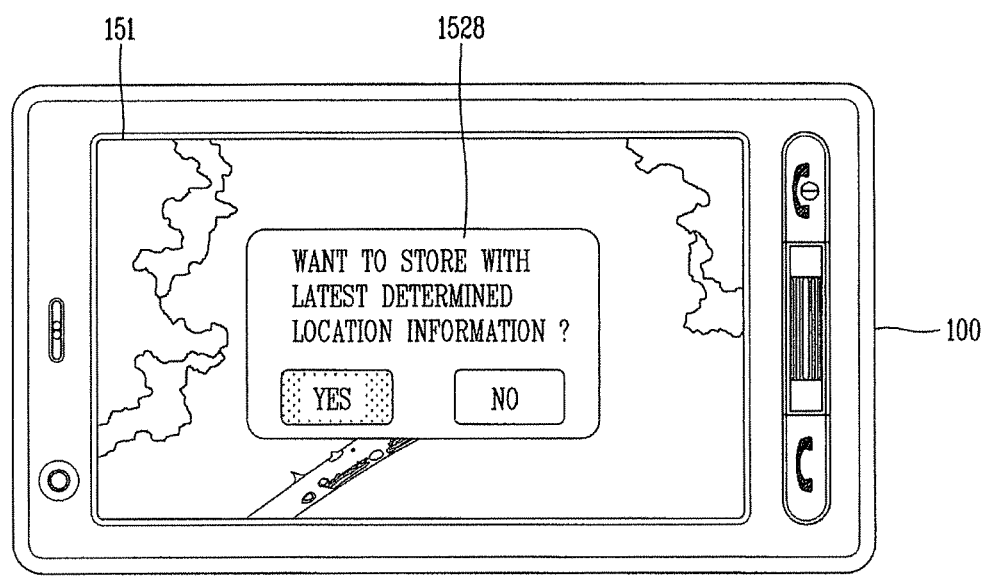

As shown in FIG. 15D, if an image capture command is input by the user via the user input unit 130 before the location information corresponding to the different location is determined, the controller 180 displays a message 1528 asking the user whether to tag the latest determined location information to the image data. The controller 180 determines whether to tag the latest determined location information to the image data based on a response from the user with respect to the message 1528.

Figure 15E:
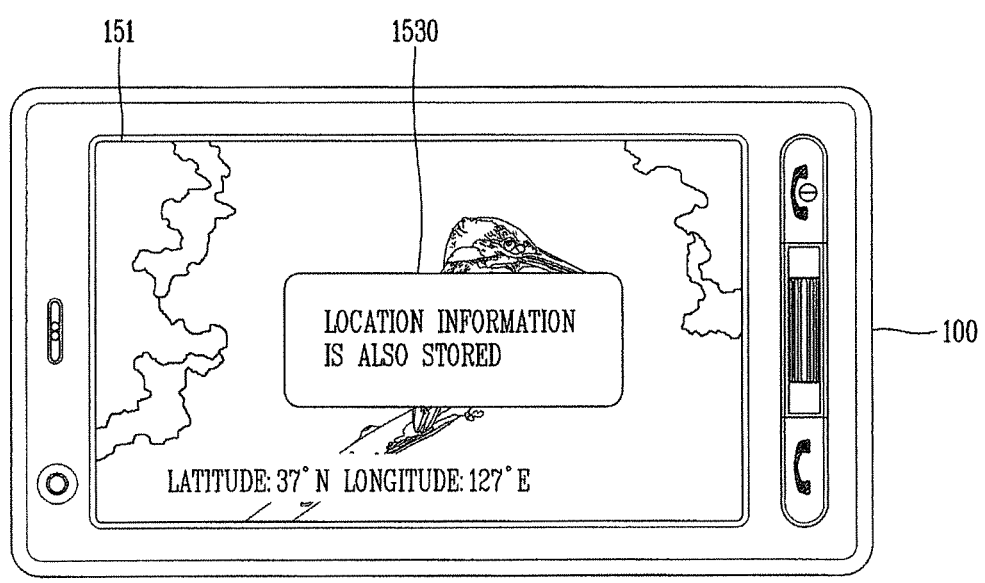

For example, if the user selects "YES" in response to message 1528, the controller 180 stores the latest determined location information with the image data. As shown in FIG. 15E, the controller 180 then displays a message 1530 to notify the user that the latest determined location information has been stored with the image data.

If the user selects "NO" in response to the message 1528, the controller 180 stores the image data without the latest determined location information. In other embodiments, the controller 180 can be configured to automatically store the latest determined location information with the image data, without first prompting the user.

In one embodiment of the invention, the controller 180 may group the image data to be stored based on the location information and geographical information determined by the location information module 115. When the geotagging function of the invention is enabled, information relating the image data to a group can be stored with the image data.

For example, the controller 180 may designate a group in which all the image data in the group share identical location information. In addition, the controller 180 can be configured to store information relating the image data to a group with the image data.

The embodiments of the present invention can be implemented as a program code that can be read by a computer from a computer-readable medium using, for example, computer software or hardware.

The computer-readable medium can be one of various types of devices in which data read by a computer system can be stored. For example, the computer-readable medium may be a read-only memory (ROM), a random-access memory (RAM), a Compact Disc read-only memory (CD-ROM), a magnetic tape, a floppy disk, or an optical data storage device. The computer-readable medium also includes implementations in the form of carrier waves or signals, such as transmission via the Internet. The computer described herein may be the controller 180 of the mobile terminal of the invention.

The mobile terminal of the present invention automatically determines location information and stores the location information with image data generated by an image capture device. The present invention facilitates the determination of location information and reduces time delays in the determination of location information.

Since the determination of the location information and the generation of image data are performed independently by distinct modules, the present invention can be configured such that the determination of location information has minimal impact on the operation of the image capture device of the mobile terminal.

Moreover, since the invention displays an indicator that indicates whether or not location information has been determined, the invention allows a user to be easily informed as to the status of the location information. Furthermore, the invention can determine geographical information corresponding to location information using a database and can store the geographical information with the image data.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal configured for geotagging image data, the mobile terminal comprising:
 a display configured to display information;
 a memory configured to store information;
 a camera configured to capture an image and generate the image data;
 a location information module configured to determine location information of the mobile terminal; and
 a controller configured to:
  control the location information module to continuously determine the location information of the mobile terminal when the camera is activated;
  control the display to display an indicator icon that indicates whether the location information is determined by the location information module;
  control the display to display the indicator icon in a first state in which the indicator icon flashes when geotagging of the generated image data is being performed and the location information is being determined;
  control the display to display the indicator icon in a second state in which the indicator icon does not flash when the location information has been determined;

control the display to reset the indicator icon to from the second state to the first state when the mobile terminal is moved to a different location;

control the camera to capture the image and generate the image data in response to a user input when the displayed indicator icon is in the second state;

control the memory to store the generated image data and the determined location information when the location information is determined;

control the display to display a notification message when the location information cannot be determined in order to inform a user that the generated image data is stored without the determined location information; and control the memory to automatically store previously-determined location information with the generated image data when the location information cannot be determined.

2. The mobile terminal of claim 1, wherein the first state is further distinguished from the second state based on a form of the displayed indicator icon or a color of the displayed indicator icon.

3. The mobile terminal of claim 1, wherein the controller is further configured to:

access a map information database stored in the memory or a server;

receive geographical information corresponding to the determined location information; and control the memory to store the received geographical information with the generated image data, wherein the determined location information comprises global positioning system (GPS) related information, and wherein the received geographical information comprises at least a name of a place, a name of a building, or a name of a road.

4. The mobile terminal of claim 1, wherein the stored location information and generated image data are each in an exchangeable image file (EXIF) format.

5. The mobile terminal of claim 1, wherein the controller is further configured to control the display to display a notification message when the determined location information has been stored with the generated image data.

6. A method for automatically geotagging image data in a mobile terminal, the method comprising:

continuously determining location information of the mobile terminal using a location information module of the mobile terminal when a camera of the mobile terminal is activated;

displaying an indicator icon on a display of the mobile terminal to indicate whether the location information is determined;

displaying the indicator icon in a first state in which the indicator icon flashes when geotagging of the image data is being performed and the location information is being determined;

displaying the indicator icon in a second state in which the indicator icon does not flash when the location information has been determined;

resetting the displayed indicator icon from the second state to the first state when the mobile terminal is moved to a different location;

generating the image data using the camera in response to a user input when the displayed indicator is in the second state;

storing the generated image data and the determined location information in a memory of the mobile terminal when the location information is determined;

displaying a notification message when the location information cannot be determined in order to inform a user that the generated image data is stored without the determined location information; and automatically storing previously-determined location information with the generated image data when the location information cannot be determined.

7. The method of claim 6, wherein the first state is further distinguished from the second state based on a form of the displayed indicator icon or a color of the displayed indicator icon.

8. The method of claim 6, further comprising:

accessing a map information database stored in the memory or a server;

receiving geographical information corresponding to the determined location information; and storing the received geographical information with the generated image data, wherein the determined location information comprises global positioning system (GPS) related information, and wherein the received geographical information comprises at least a name of a place, a name of a building, or a name of a road.

9. The method of claim 8, further comprising:

grouping a plurality of generated image data according to the determined location information and received geographical information; and storing the plurality of generated image data in the memory based on the grouping.

10. The method of claim 6, further comprising:

displaying a message on the display when the displayed indicator icon is in the first state, the message notifying the user that the location information has not yet been determined.

11. The method of claim 6, further comprising:

displaying a notification message informing that the determined location information has been stored with the generated image data.

* * * * *